US011243766B2

(12) United States Patent
Branco

(10) Patent No.: US 11,243,766 B2
(45) Date of Patent: Feb. 8, 2022

(54) FLEXIBLE INSTRUCTION SET DISABLING

(71) Applicant: Intel Corporation, Santa Clara, CA (US)

(72) Inventor: Rodrigo Branco, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 16/582,701

(22) Filed: Sep. 25, 2019

(65) Prior Publication Data
US 2020/0019403 A1 Jan. 16, 2020

(51) Int. Cl.
G06F 9/455 (2018.01)
G06F 1/3293 (2019.01)
G06F 9/30 (2018.01)
G06F 9/32 (2018.01)
G06F 9/52 (2006.01)

(52) U.S. Cl.
CPC ...... *G06F 9/30036* (2013.01); *G06F 9/30076* (2013.01); *G06F 9/30196* (2013.01); *G06F 9/32* (2013.01); *G06F 9/52* (2013.01)

(58) Field of Classification Search
None
See application file for complete search history.

(56) References Cited

U.S. PATENT DOCUMENTS

| 7,589,362 B1* | 9/2009 | Argyres | H01L 23/585 257/208 |
|---|---|---|---|
| 2003/0033593 A1* | 2/2003 | Duesterwald | G06F 9/45504 717/138 |
| 2003/0085903 A1* | 5/2003 | Hrusecky | H04N 9/641 345/519 |
| 2003/0217248 A1* | 11/2003 | Nohl | G06F 9/45516 712/208 |
| 2006/0149927 A1* | 7/2006 | Dagan | G06F 9/30174 712/43 |
| 2008/0256330 A1* | 10/2008 | Wang | G06F 9/3851 712/24 |
| 2011/0047357 A1* | 2/2011 | Stempel | G06F 9/30072 712/220 |
| 2012/0260073 A1* | 10/2012 | Henry | G06F 9/30123 712/221 |
| 2013/0336395 A1* | 12/2013 | Joshi | H04N 19/127 375/240.12 |
| 2015/0220445 A1* | 8/2015 | Stark | G06F 12/109 711/156 |
| 2016/0098277 A1* | 4/2016 | Day | G06F 9/3814 712/200 |
| 2016/0147517 A1* | 5/2016 | Vicovan | G06F 11/3636 717/140 |

(Continued)

OTHER PUBLICATIONS

Karaki et al., "Multiple Instruction Sets Architecture (MISA)", 2011, IEEE (Year: 2011).*

(Continued)

*Primary Examiner* — Hyun Nam
(74) *Attorney, Agent, or Firm* — Patent Capital Group

(57) ABSTRACT

There is disclosed in one example a microprocessor, including: a decoder; an execution unit; an instruction set flag vector; and logic to decode an instruction, read a binary disable flag for the instruction within the instruction set flag vector, and execute the instruction within the execution unit only if the disable flag for the instruction is not set.

20 Claims, 23 Drawing Sheets

(56) References Cited

U.S. PATENT DOCUMENTS

2016/0202980 A1* 7/2016 Henry ............... G06F 9/30101
712/213
2019/0095209 A1* 3/2019 Grant ................ G06F 9/3005

OTHER PUBLICATIONS

Gruss, Daniel, et al., "Prefetch Side-Channel Attacks: Bypassing SMAP and Kernel ASLR," CCS'16, ACM Conference on Computer and Communications Security, Oct. 24-28, 2016, Vienna, Austria; 12 pages.

Jang, Yeongjin, et al., "Breaking Kernel Address Space Layout Randomization with Intel TSX," Blackhat USA 2016, Aug. 2-4, 2016, Las Vegas, Nevada; 16 pages.

* cited by examiner

804

| ADDR | NOP | #UD | LOCK |
|---|---|---|---|
| 0 | 0 | 0 | 0 |
| 1 | 0 | 0 | 0 |
| 2 | 1 | 0 | 0 |
| 3 | 0 | 0 | 0 |
| 4 | 0 | 0 | 0 |
| . | . | . | . |
| . | . | . | . |
| n | 0 | 0 | 0 |

| ADDR | NOP | #UD | LOCK |
|---|---|---|---|
| 0 | 0 | 0 | 0 |
| 1 | 0 | 0 | 0 |
| 2 | 1 | 1 | 0 |
| 3 | 0 | 0 | 0 |
| 4 | 0 | 0 | 0 |
| . | . | . | . |
| . | . | . | . |
| n | 0 | 0 | 0 |

| ADDR | NOP | #UD | LOCK |
|---|---|---|---|
| 0 | 0 | 0 | 0 |
| 1 | 0 | 0 | 0 |
| 2 | 1 | 0 | 1 |
| 3 | 0 | 0 | 0 |
| 4 | 0 | 0 | 0 |
| . | . | . | . |
| . | . | . | . |
| n | 0 | 0 | 0 |

*Fig. 8c*

816 — SET #UD THROWS AN ERROR

| ADDR | NOP | #UD | LOCK |
|---|---|---|---|
| 0 | 0 | 0 | 0 |
| 1 | 0 | 0 | 0 |
| 2 | 1 | 1 | 1 |
| 3 | 0 | 0 | 0 |
| 4 | 0 | 0 | 0 |
| . | . | . | . |
| . | . | . | . |
| n | 0 | 0 | 0 |

| ADDR | NOP | #UD | LOCK (GLOBAL) == 0 |
|------|-----|-----|--------------------|
| 0    | 0   | 0   |                    |
| 1    | 0   | 0   |                    |
| 2    | 1   | 0   |                    |
| 3    | 0   | 0   |                    |
| 4    | 0   | 0   |                    |
| .    | .   | .   |                    |
| .    | .   | .   |                    |
| n    | 0   | 0   |                    |

Fig. 9b (908)

| ADDR | NOP | #UD | LOCK (GLOBAL) == 1 |
|------|-----|-----|--------------------|
| 0    | 0   | 0   |                    |
| 1    | 0   | 0   |                    |
| 2    | 1   | 1   | SET #UD THROWS AN ERROR |
| 3    | 0   | 0   |                    |
| 4    | 0   | 0   |                    |
| .    | .   | .   |                    |
| .    | .   | .   |                    |
| n    | 0   | 0   |                    |

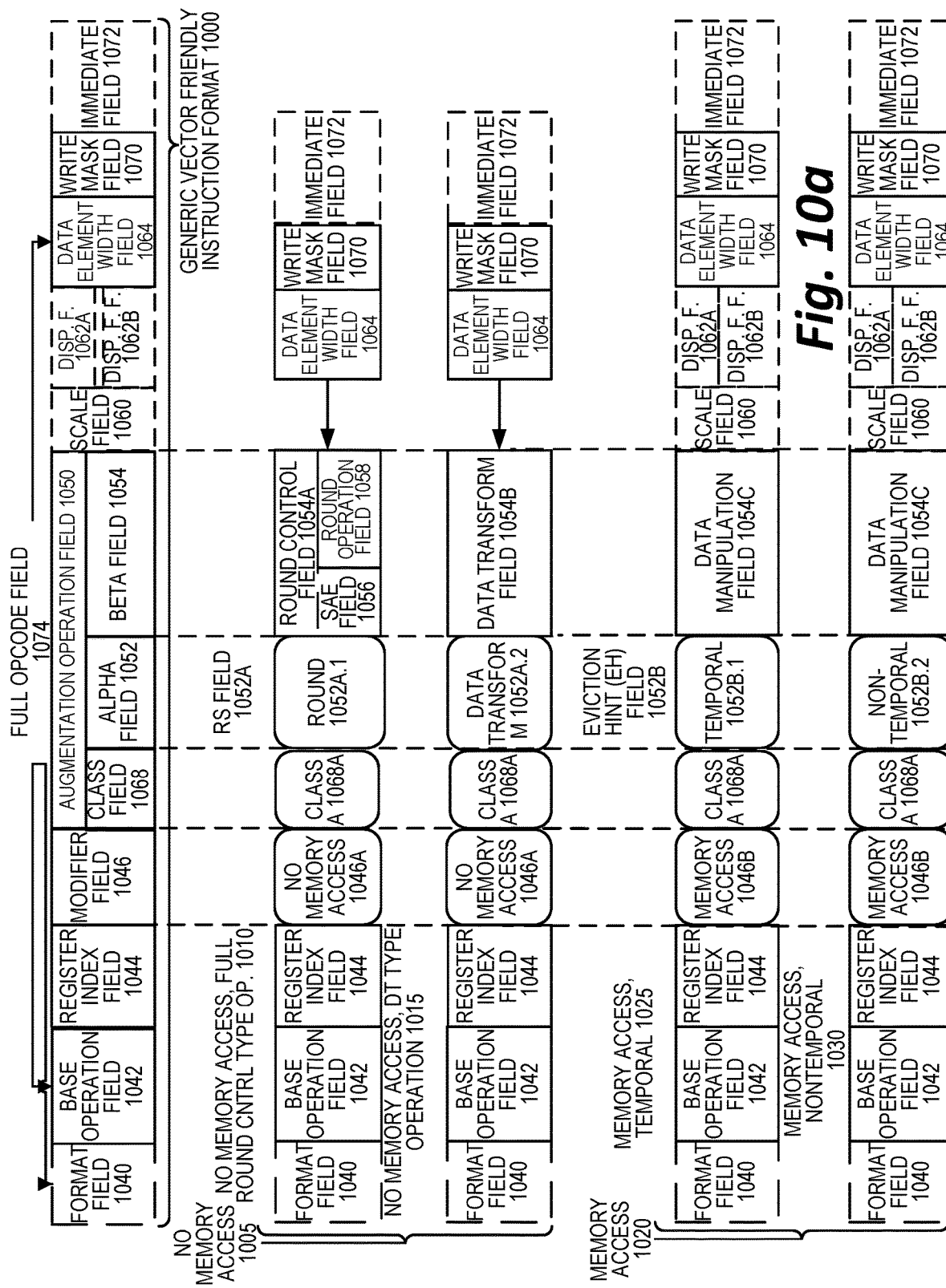

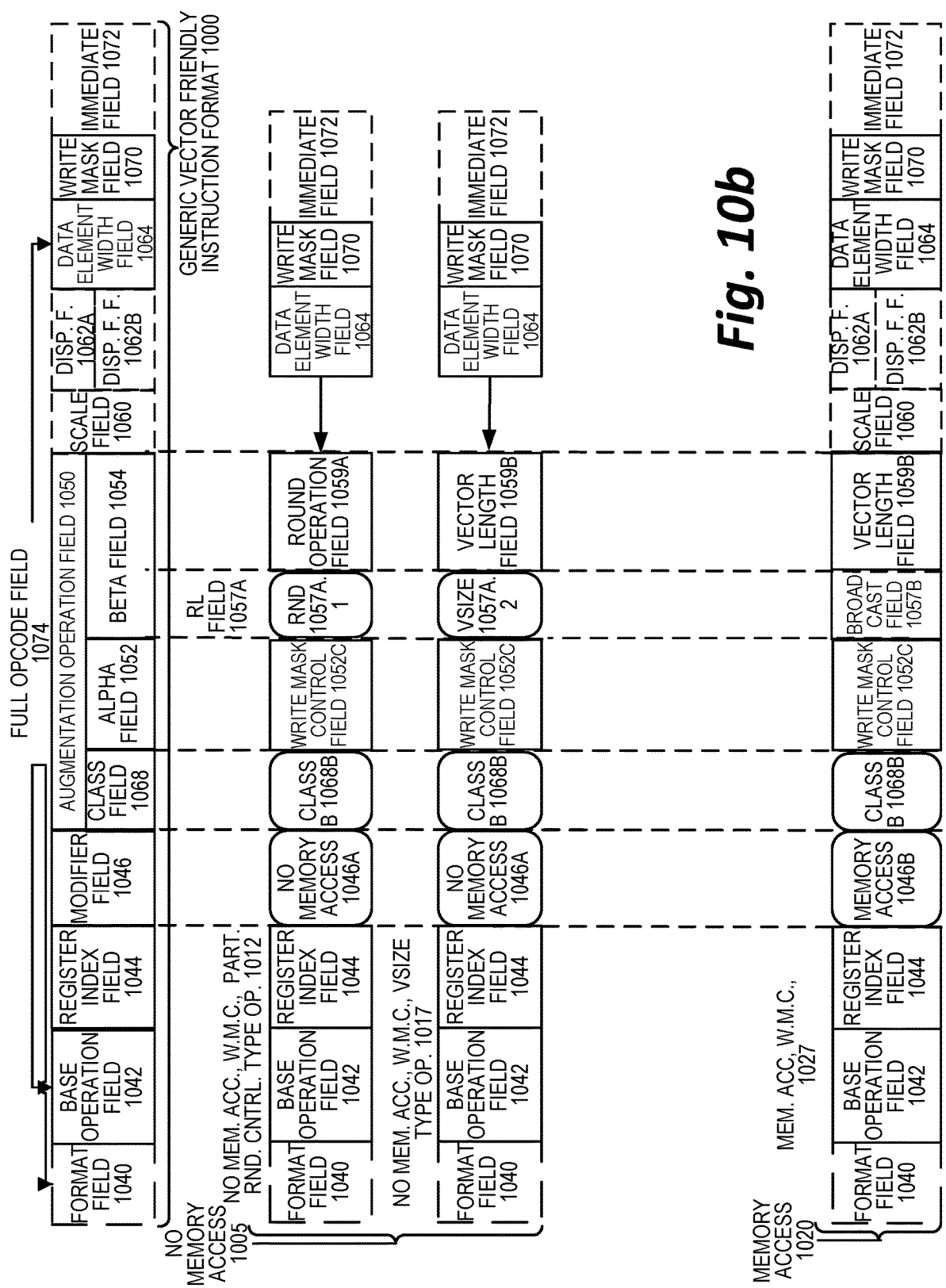

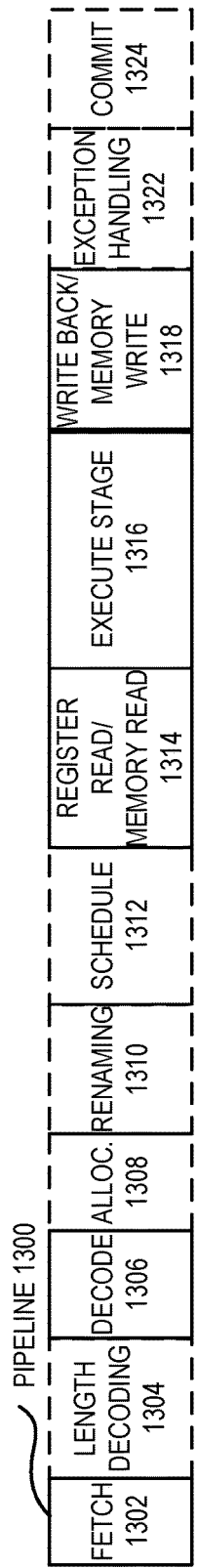
*Fig. 13a*
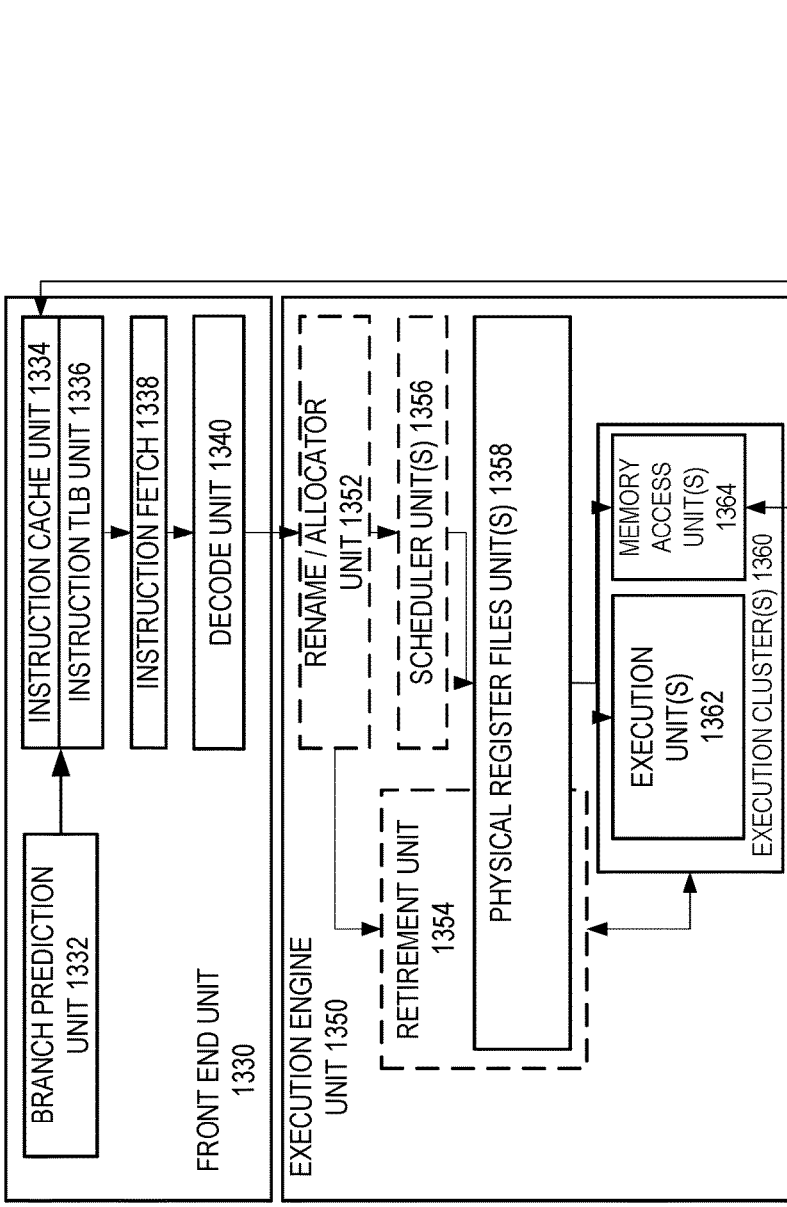
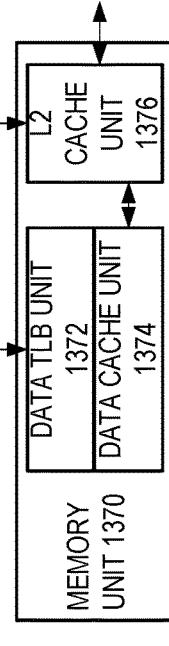
*Fig. 13b*

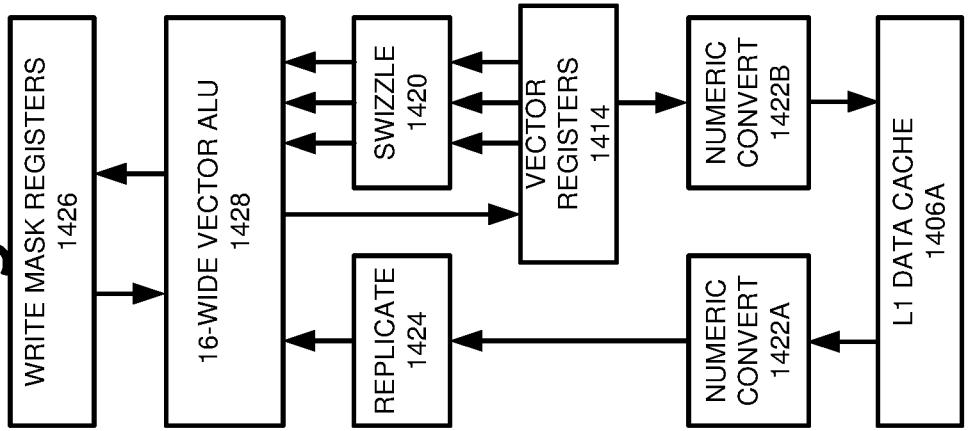
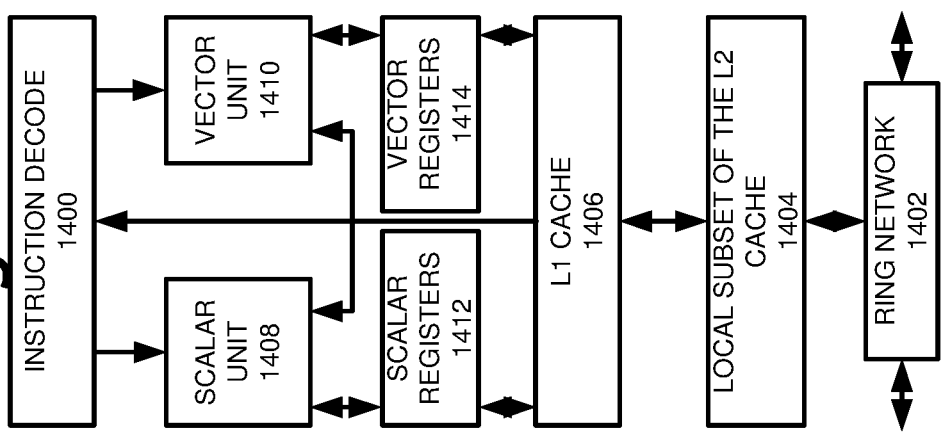

FLEXIBLE INSTRUCTION SET DISABLING

FIELD OF THE SPECIFICATION

This disclosure relates in general to the field of computer architecture, and more particularly, though not exclusively, to a system and method for providing flexible instruction set disabling.

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable and secure processors increases.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 8a-8d illustrate various locking mechanisms that may be provided in different embodiments of the present specification.

FIGS. 9a-9b illustrate data structures with a global lock flag in place.

FIGS. 10a-10b are block diagrams illustrating a generic vector-friendly instruction format and instruction templates thereof.

FIG. 13a is a block diagram illustrating both an example in-order pipeline and an example register renaming an out-of-order issue/execution pipeline.

FIG. 13b is a block diagram illustrating both an example of an in-order architecture core and an example register renaming an out-of-order issue/execution architecture core to be included in a processor.

FIGS. 14a-14b illustrate a block diagram of a more specific in-order core architecture, which core would be one of several logic blocks (including other cores of the same type and/or different types) in a chip.

EMBODIMENTS OF THE DISCLOSURE

Figure 1:
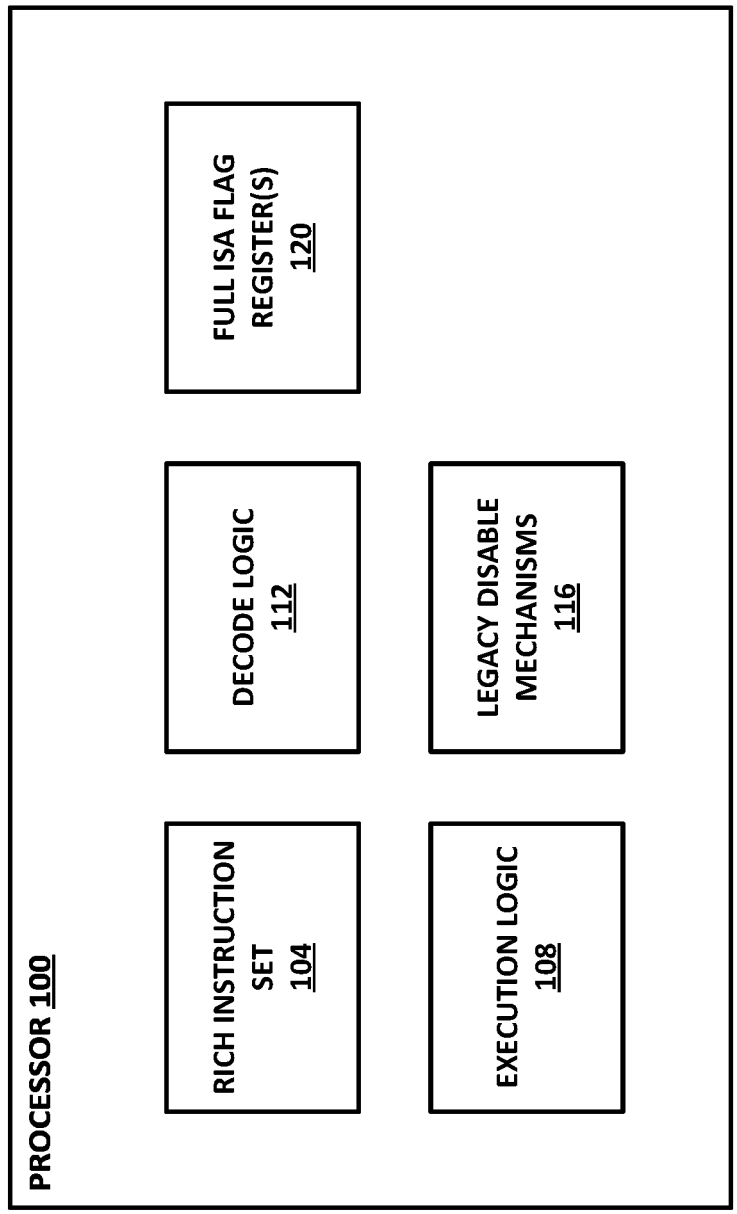
FIG. 1 is a block diagram of a processor.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A modern complex instruction set computer (CISC) has a rich instruction set, which may include thousands of instructions. For example, contemporary Intel® Xeon® and core processors support on the order of 2,000 instructions. These instructions may have specific security, multimedia, mathematical, graphics, or other processing capabilities. Many of these more complex instructions are not implemented directly in hardware (as are simpler instructions such as "move," "compare," or "jump"), but rather may be implemented in microcode. Microcode is a low-level programming technique whereby more complex instructions are programmed as a sequence of pure hardware instructions. Because microcode is a feature of the processor, itself, microcode instructions are generally much faster than a device programmer can realize using even well-crafted assembly code.

In a complex instruction set architecture, there are some circumstances where it is desirable to disable at least some instructions. For example, there may be legal reasons to disable one or more instructions, such as export compliance. In one example, the instruction "Advanced Encryption Standard-New Instructions" (AES-NI) is disabled due to import and export controls. In other examples, instructions may need to be disabled for security reasons. For example, some newer attacks abuse prefetch and the transactional synchronization extensions (TSX) instruction set by bypassing security functionalities such as the kernel address space layout randomization (KASLR) instruction.

In yet other embodiments, an instruction may be disabled at the request of a customer. For example, a cloud platform-as-a-service (PaaS) provider may have the option of selecting between a less expensive processor with fewer instructions available and a more expensive processor with more instructions available. Economically, it may be more cost-effective for the cloud service provider to provision a number of identical or nearly identical machines with the same more expensive and more capable processor. However, in some cases, it may make more sense for the cloud service provider to permit end users to provision a machine as though it had a less-capable processor. This ensures that only those who need the more expensive features are paying for them. Thus, the cloud service provider might want to hide certain information or instructions so that it can update machines in its cloud services without giving additional functionality to customers who do not wish to pay for it.

When these circumstances are anticipated, it is possible for a central processing unit (CPU) designer to build in mechanisms to disable certain instructions so that they can be disabled either at build time (e.g., by setting or unsetting fuses or anti-fuses), or by providing a model specific register (MSR) that a customer such as a cloud service provider can access to disable certain instructions, such as those that are considered an "upgrade" for the customer.

It is not, however, possible in every case to anticipate which instructions may need to be disabled in the future. For example, at the time prefetch was designed, there was no mechanism to disable prefetch because system designers and security experts did not anticipate the security impact. In fact, the security mechanism that creates the vulnerability actually came after the instruction itself was designed.

Adding custom configuration options for each instruction is challenging and can involve many different considerations. It can also conflict with legacy cases, thus requiring patches or new releases of the platform. However, a computer architecture can be built that provides a flexible mechanism, such as an internal register that can be programmed via an MSR to flexibly enable or disable any instruction within the instruction set. This mechanism provides greater flexibility, while advantageously maintaining backward compatibility with legacy uses.

An embodiment of the present specification includes a bitmap array or vector covering all or substantially all instructions supported in the instruction set architecture (ISA). The bitmap indicates whether a given instruction is enabled or disabled for that particular system. For example, the bitmap may have an array of flags, and when a flag is set, it indicates that the associated or corresponding instruction for that flag is disabled.

In various embodiments, the bitmap array may be constructed to map 1:1 for every instruction, or to have an n:1 mapping for special cases of complex instructions. The bitmap array may also have more entries than may be required to support the number of known instructions, providing flexibility for supporting newly added instructions in the platform later on. This can be accomplished without changing the legacy code if the number of flags does not need to be changed.

For purposes of illustration throughout this specification, a processor is described as having 1,500 available instructions in its ISA. A bitmap is configured with at least 2,000 entries. Entries 1 through 1500 map to individual instructions, while entries 1500 through 2000 are reserved.

In an embodiment, when the system is first started, all entries are initialized to a value of 0, meaning that the instruction is not disabled. Zero is provided as a nonlimiting example, and in other embodiments entries could default to 1, meaning that the instruction is enabled. Throughout this specification, for simplicity and clarity, the example of 0 indicating that the instruction is not disabled (or in other words, the instruction is enabled) is used. The teachings of this specification may be treated as equally applicable to the case where 1 indicates that the instruction is enabled, and the two options are considered equivalent so long as the default value indicates that the instruction is enabled.

If privileged software, such as a hypervisor or operating system, wants to disable a given instruction, it writes a 1 to the entry in the bitmap table for that instruction. At runtime, microcode flow checks whether the instruction is enabled or disabled before executing the instruction. If the instruction is disabled, then according to system configuration, the instruction may be treated as a no-op (NOP), or alternately an error code such as #UD is thrown. In other embodiments, separate flags may be provided for the case of NOP versus #UD, so that either one can be set as necessary to the particular deployment.

In at least some embodiments, checking the entry for whether the instruction is enabled is O(1), because the map between the instruction and the entry is fixed. Therefore, the system can be designed without affecting performance as the number of instructions increases. This can also permit the use of a global instruction map that applies to all CPUs of a particular product line or family of product lines, so long as a sufficient number of entries are provisioned to cover all instructions available within that product line.

Notably, the instruction-enabled bitmap of the present specification does not need to change or affect legacy implementations. If an instruction is disabled using a legacy mechanism, such as a fuse, antifuse, flag, register, MSR, or other mechanism, that entry need not conflict with the full-scope instruction bitmap. For example, if the bitmap value for the instruction is 0 but the legacy disable mechanism is set, the instruction is disabled. On the other hand, if the bitmap entry for the instruction is set, then the processor does not need to care about the legacy mechanism. In some cases, this can actually increase the speed of ignoring instructions disabled by a legacy mechanism, if checking the bitmap is faster than checking the legacy mechanism. This will be true in many cases because the full ISA flag register that contains the bitmap of the present specification maps 1:1 or 1:n to instructions, and is checked as each new instruction is fetched.

Thus, legacy mechanisms for disabling instructions do not suffer any interference. The full ISA flag register that provides the bitmap for which instructions are disabled is an additional layer, meaning that the platform checks the bitmap for instruction disabling. If the instruction is not disabled, then it will check the legacy mechanism to see if the instruction is otherwise disabled.

The full ISA flag register of the present specification also does not affect instruction enumeration (CPUID) for legacy instructions. The vector is initialized with all instructions enabled, which is fast. Only code interested in disabling something specific would then manipulate the appropriate entry. Therefore, the full ISA flag register can be viewed as a "complete supported instruction set" for an entire family of processors. The table can therefore be common to the entire family. For example, if a given instruction exists only in a more expensive, large core processor for the data center, but is not available in a less expensive consumer processor, the full ISA flag register can still contain the entire bitmap, thus providing a bitmap that is common to all CPUs in the family. Thus, there is no need for per-part changes. If the full ISA flag register has an integer value of 0, then this means that all instructions supported by the current CPU are enabled, and does not imply that there is a mechanism to execute instructions included in the bitmap vector but not supported by the specific processor model. If software sets an entry for an unsupported instruction, there is no need for the processor to perform any handling of this erroneous set. Because the instruction is not supported anyway, the flow for that instruction will not be triggered, and the flag for that instruction can essentially be ignored. Thus, the full ISA flag bitmap can be provided as a simple implementation that can cover a number of processors in a product line, or even in different product lines, so long as sufficient flags can be provided to cover all instructions available in the family of product lines.

There is also no requirement to have a lock mechanism in the full ISA flag bitmap. Instructions that specifically call for a lockable enable or disable still have their specific legacy registers that provide locked enable or disable flags. However, a similar locking mechanism can optionally be applied or extended in various ways.

In one example, two bitmap entries are provided for each instruction. One indicates that the instruction should be considered an NOP. The other indicates that the instruction should be considered nonexistent, and an attempt to execute the instruction should throw an exception such as the #UD exception. This distinction is useful in various contexts. For example, some software may be provided to attempt to use the instruction if it is available. If the instruction is not available, then its effect can be emulated in software, or other instructions can be used. In contrast, in the example above where cloud customers pay for greater capability, it may be more useful to throw a #UD exception if there is an attempt to access an instruction that is disabled for that particular customer.

The NOP transformation gives privileged software the opportunity to simply ignore certain instructions. For example, prefetch can simply be ignored because executing it does not affect the output of software, only its performance.

Using two bits for each instruction also provides the opportunity for a novel locking mechanism. Good practice indicates that both bits should not be set simultaneously. The instruction should not simultaneously be an NOP and nonexistent. Thus, in some embodiments, the processor can use the case of both bits being set as a flag that the change is locked. The action taken can then be based on the first bit that was set. For example, if the OS first sets the NOP bit, thus transforming the instruction into an NOP, and then sets the #UD bit, this means the instruction is locked to NOP. When the instruction is locked, it can only be unlocked by manually unsetting both bits, optionally in the correct order. An attempt to unset the NOP bit without first unsetting the #UD bit may result in an exception. The internal representation of this state would still need to track with the flagged state, but from a software view, operation of the flags is simplified.

In other embodiments, a more traditional approach could be used in which an additional lock bit is used for each flag, or a global lock bit is used for the entire register or array.

The locking mechanism described above gives privileged software, such as hypervisors and operating systems, the ability to create better traces, because now each instruction of interest can trigger a #UD exception. This can be done without extra instrumentation for changing the binaries analyzed. It also can help the hypervisor to hide features based on any motivation, including business motivations.

A system and method for providing flexible instruction set disabling will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the FIGURES below detail example architectures and systems to implement embodiments of the above.

In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

FIG. 1 is a block diagram of a processor 100. In this example, processor 100 includes complex search circuitry to provide a CISC architecture including a rich instruction set 104. Processor 100 also includes decode logic 112 to decode instructions within rich instruction set 104, and execution logic 108 to execute the instructions. In some cases, execution logic 108 includes microcode to implement at least some of the instructions within rich instruction set 104.

Processor 100 includes a number of legacy disable mechanisms 116. Legacy disable mechanisms 116 may be provided to enable or disable certain selected instructions within rich instruction set 104. However, processor 100 also includes a full ISA flag register 120. Full ISA flag register 120 is referred to as a register to indicate that, in at least some embodiments, it may be provided within memory cells provided on the hardware of processor 100. However, this need not always be the case. In other examples, the bitmap provided by full ISA flag registers 120 could be provided in cache, in firmware, or in some other memory structure. Furthermore, full ISA flag register 120 need not be a traditional register, such as a specific 64-bit register on a 64-bit computer architecture. Rather, full ISA flag register 120 may have as many flags as are necessary to provide coverage for the full instruction set architecture.

Although coverage for the full instruction set is provided by way of illustrative and nonlimiting example, other constructions are also possible. For example, rather than covering the full instruction set, a subset or portion of the instruction set could be covered by the flags provided within ISA flag register 120. As further illustrated in FIGS. 6 and 7, in some cases a plurality of registers could be used to divide the instruction set into regions, and instructions can be enabled or disabled on a per-region basis. For example, if 2,000 instructions are to be covered as in the example above, then a 4-bit by 512-bit data structure could cover all 2,000 entries with 48 entries to spare. In this example, the instruction set is divided into four regions, and one of the four bits is set to indicate which of the four regions is currently represented by the 512-bit structure. In another embodiment, a similar result can be realized with a 2-bit by 512-bit structure, with the region represented binary encoded within the two bits. In that case, because ISA flag register 120 cannot simultaneously represent all available instructions, some off-core storage (such as in cache) can be used to store the state of instructions not currently represented in full ISA flag register 120. This structure would be particularly useful in cases where regions of code can be broadly divided into functional sub-units. Instructions that map to those sub-units can then be loaded into the register and checked in real time. When another region of code is reached, the flag set for the instructions in that set can be loaded into the register. This structure would be useful in an architecture where register space is at a premium, such as in smaller or less expensive processors. In those cases, there may be a performance hit for swapping groups of instructions in and out of cache, but that may be acceptable for budget applications.

Figure 2:
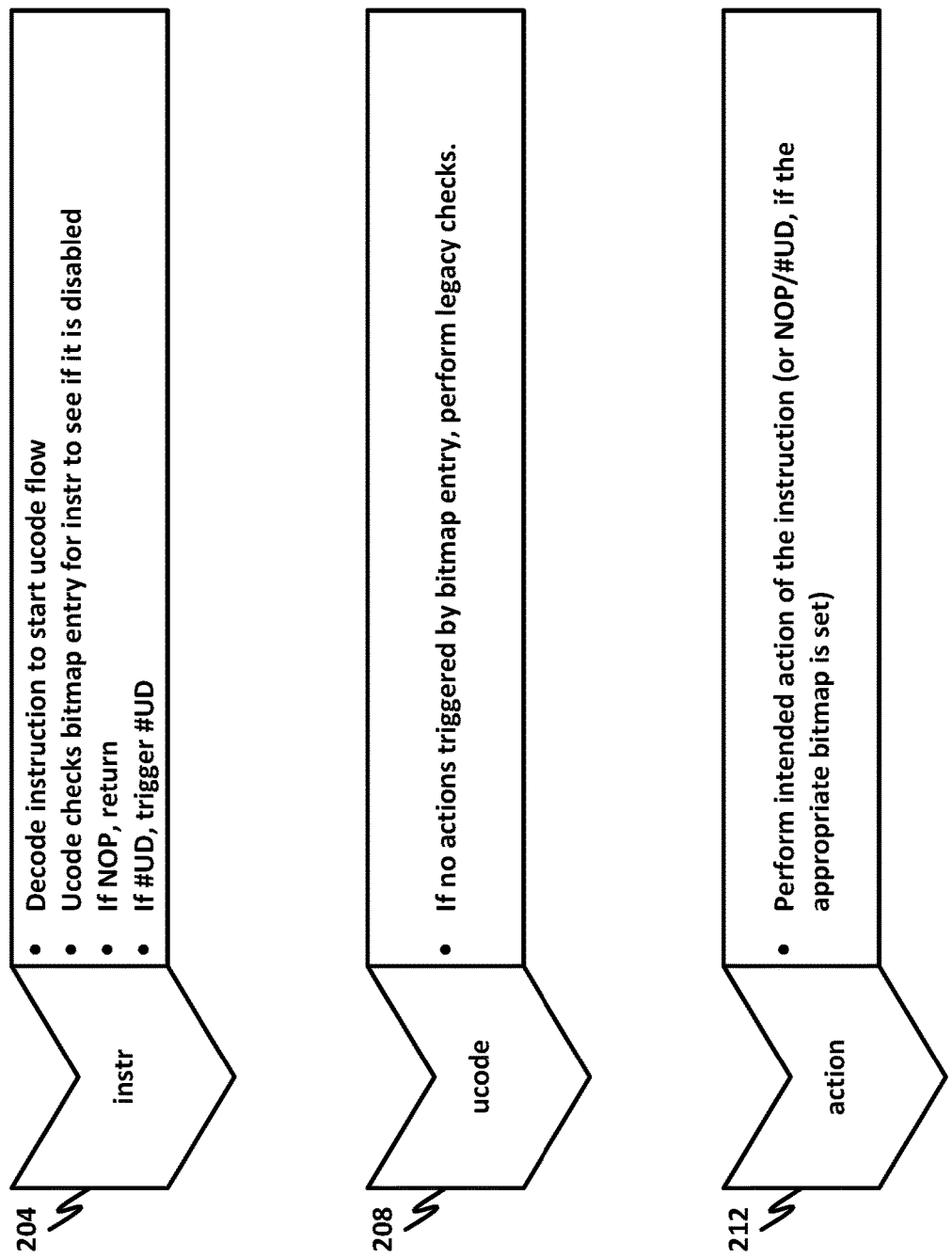
FIG. 2 illustrates the breaking of instruction execution into three blocks.

FIG. 2 illustrates the breaking of instruction execution into three blocks, namely block 204 instruction, block 208 microcode, and block 212 action.

In block 204, the decoder of the core first decodes the instruction to start the microcode flow. The core then checks the microcode within the core, then checks the bitmap entry for the instruction to see if the instruction is disabled. In some embodiments, this is a 1:1 mapping, while in other embodiments it may be a 1:n mapping as described throughout this specification. In the case of a 1:1 mapping, looking up the instruction can happen very quickly, and indeed may occur in less than a single clock cycle. If there is 1:n mapping, then depending on whether the flag for the instruction is currently in the bitmap, it may take more than one cycle to check the instruction. In some embodiments, if the instruction is not currently in the bitmap, then the bitmap is ignored, and it is assumed that the instruction is enabled. This embodiment is useful in the case where there is some subset of the instruction set that is known to be of interest in present applications. Although the full bitmap may still cover the full instruction set, which provides flexibility for future expansion, instructions in the non-selected instruction region may not be of interest for disabling at the time.

The microcode determines if one or more flags are set, and acts accordingly. For example, if an NOP flag is set for the instruction, then the instruction simply returns without performing any operation. On the other hand, if the #UD flag is set, then the #UD exception may be thrown.

In block 208, microcode will perform legacy checks if no actions are triggered by the bitmap entry. For example, if both the NOP and the #UD flag are unset, microcode will check legacy mechanisms such as legacy registers, fuses, microcode, firmware, or other mechanisms that may be used to disable specific instructions.

In block 212, an action is performed. If no flags are set, and no legacy disabling is set, then the microcode simply performs the intended instruction. If an NOP flag or a #UD flag are set, then the microcode will perform the appropriate instruction.

Figure 3:
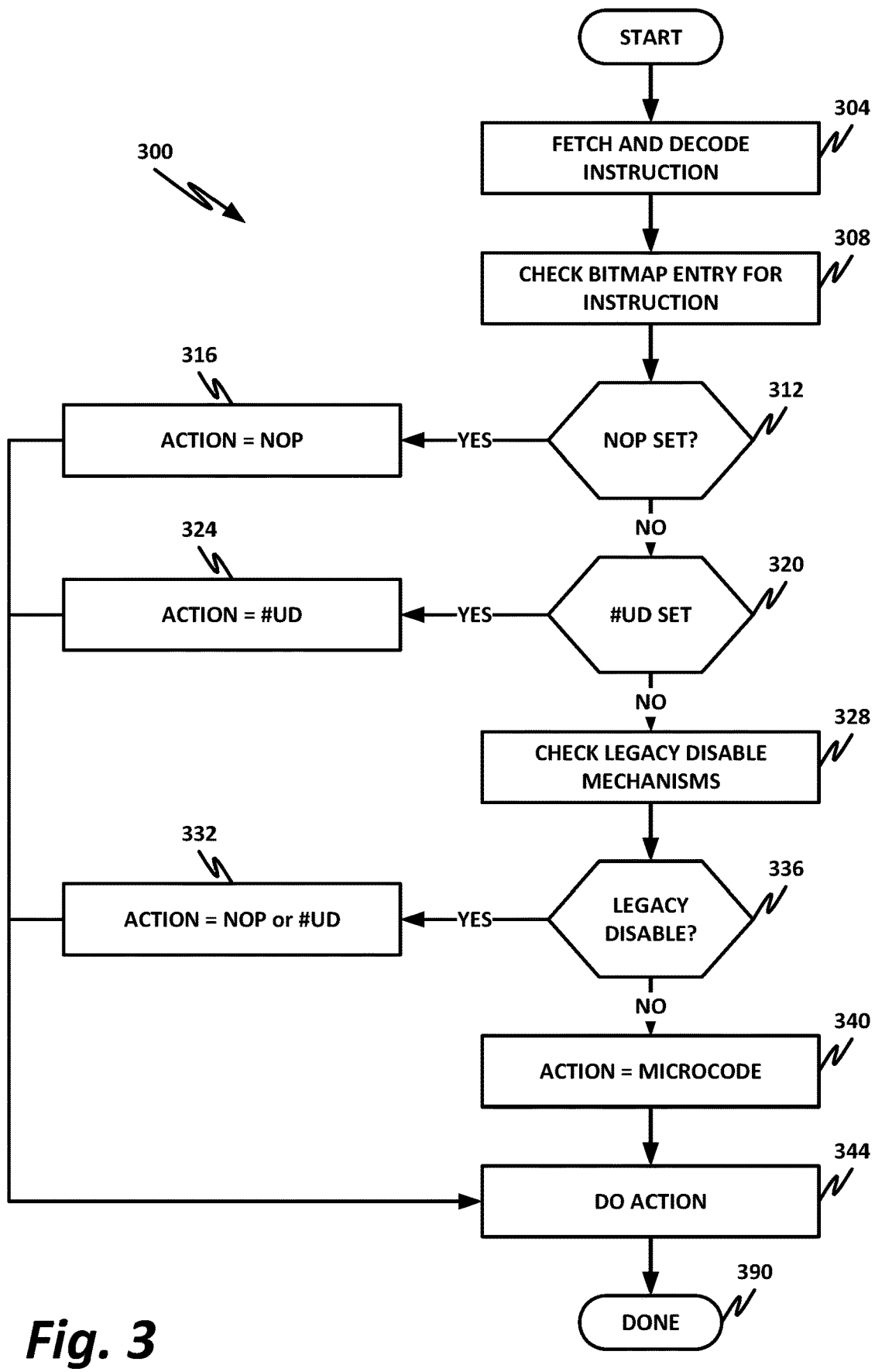
FIG. 3 is a flowchart illustrating a method of disable flag checking.

FIG. 3 is a flowchart illustrating a method of disable flag checking.

Starting in block 304, the core fetches and decodes the next instruction in the sequence of instructions.

In block 308, once the core has the identity of the next instruction, it checks the bitmap entry for that instruction. As described above, this may be a 1:1 bitmap entry that can be checked in a single cycle. In other embodiments, it may be found that there is no bitmap entry, in which case the appropriate region of instructions may need to be swapped into the register, or alternatively the entry can just be ignored and it is assumed that the instruction is enabled.

In decision block 312, the core checks whether the NOP flag is set for this instruction. This corresponds to an embodiment in which the NOP flag takes precedence over the #UD flag. In this case, if the NOP flag is set, then in block 316, the action for the instruction is set to NOP.

Block 344 is a metablock that simply executes whatever reaction has been set for the instruction. In this case the instruction is an NOP, so in block 344 the core performs the action, or in other words, simply returns.

Returning to decision block 312, if the NOP flag is not set, then in decision block 320, the core next checks to see whether the #UD flag is set for this instruction.

In block 324, if the #UD option is set, then the action is set to #UD. In block 344, the core performs the action, namely the core throws a #UD exception.

Returning to decision block 320, if the #UD is not set, then in this case there are no disable flags set in the instruction bitmap. In block 328, microcode can then check legacy disable mechanisms.

In decision block 336, the microcode determines whether any legacy disable mechanisms have been set.

If a legacy disable is set, then in block 332, the microcode sets the appropriate action, such as NOP, #UD, some other exception, or some other action for the instruction disable according to legacy mechanisms. In block 344, the core performs the appropriate action.

Returning to decision block 336, if no legacy disable mechanism has been set, then in block 340, the microcode sets the action to performing the microcode action of the instruction. In block 344, the action for the instruction is performed. In block 390, the method is done.

Figure 4:
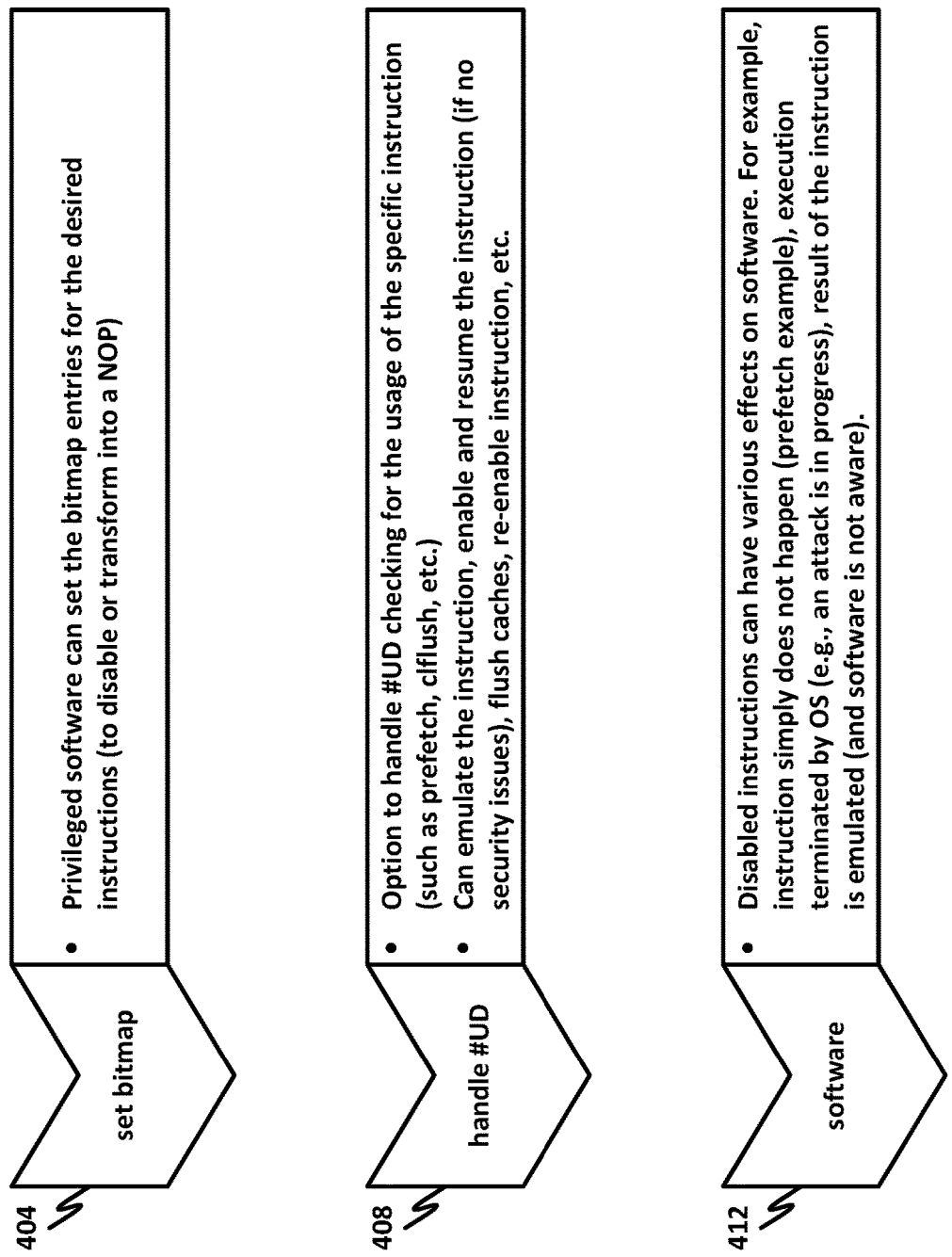
FIG. 4 is a block diagram illustrating a flow for privileged software to set bitmaps for enabling or disabling instructions.

FIG. 4 is a block diagram illustrating a flow for privileged software to set bitmaps for enabling or disabling instructions. This flow is divided into block 404 set bitmap, block 408 handle #UD, and block 412 software.

Block 404 is the block in which privileged software attempts to set the bitmap. Privileged software is enabled to set bitmaps for desired instructions. This can disable the instruction, transform the instruction into an NOP, cause an attempt to execute the instruction to throw an exception, or otherwise alter the behavior of the instruction.

In block 408, the core handles the #UD option. First, the core should check whether the option is configured to handle the #UD for the usage of specific instructions (such as prefetch, C+, or similar).

In some embodiments, the core can emulate the instruction even if it is not disabled, or the instruction can be emulated in software. For example, the core may enable and resume the instruction. If this does not cause a security issue, it may flush caches, and then re-enable the instruction.

Block 412 illustrates the effect of disabled instructions on software. Disabled instructions may have various effects on software. For example, instructions may simply not happen (e.g., in a prefetch example), in which case the instruction simply acts as an NOP. In other cases, execution may be terminated by the operating system, which may be the result of an indication that the presence of this instruction signals that an attack is in progress. In other cases, the processor can effectively emulate the operation of the instruction, even though the native instruction is not provided in hardware or microcode. In that case, the processor (via emulation) effectively provides the result of the instruction, but may provide it in a less performant manner than if the native instruction itself were present.

Figure 5:
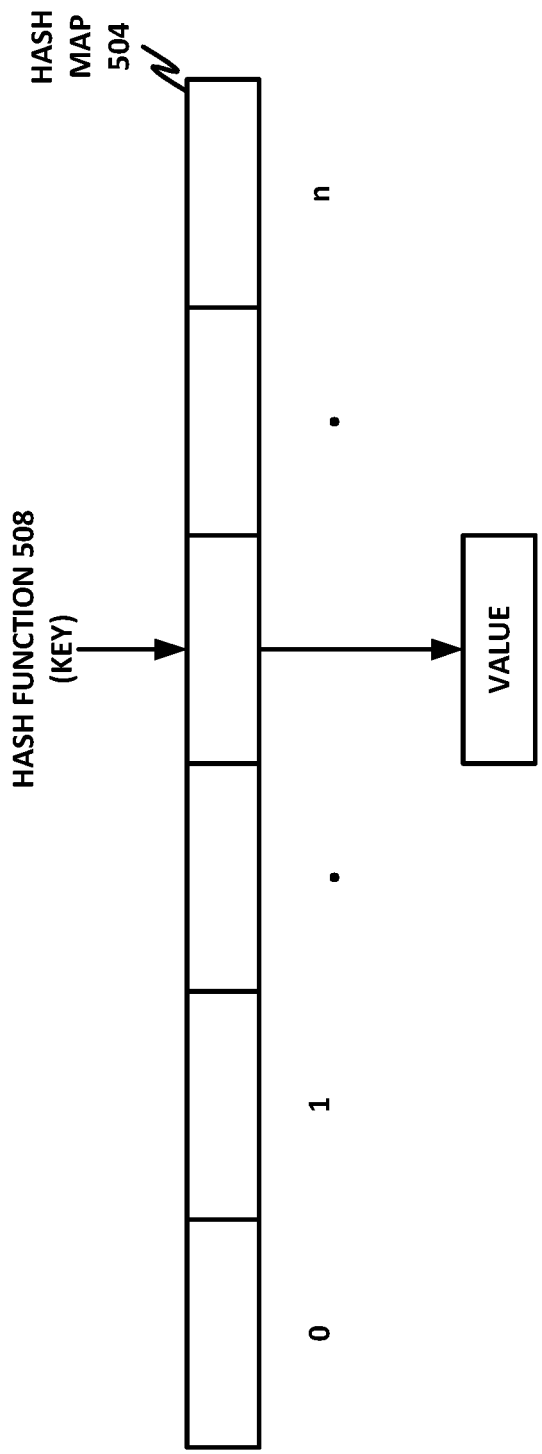
FIG. 5 is a block diagram of a hash map that may be used to store binary values of flags.

FIG. 5 is a block diagram of a hash map 504 that may be used to store binary values of flags. In this case, a hash function 508 provides a key that is indexed into hash map 504. Hash map 504 is hashed with key 508, to yield a value from the selected cell of hash map 504.

In one example, the key is the instruction opcode, and hash function 508 gives the index for the fixed map of the bitmap. This provides the bitmap entry for the bit or bits containing the desired value.

The instruction enabling and disabling described provides flexibility and control over the ISA, that may be visible to privileged software. This has beneficial results for security, and also for debugging, tracing, and commercial applications.

Figure 6:
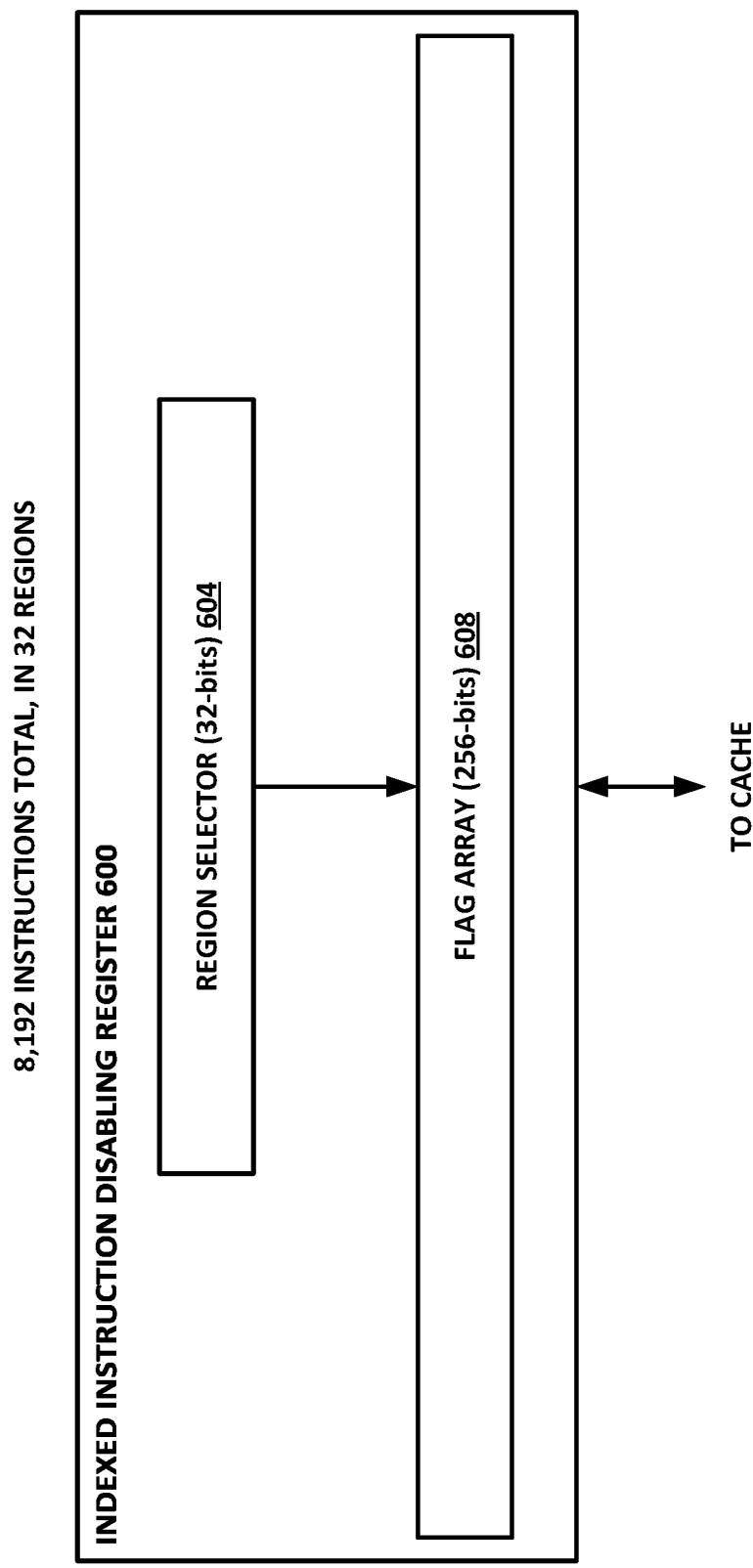
FIG. 6 illustrates an indexed instruction disabling register.

FIG. 6 illustrates an indexed instruction disabling register 600. In this example, a flag array 608 includes 256 bits. The 256 bits of flag array 608 may not be enough to cover all of the desired instructions in the instruction set. Thus, in this example, a 32-bit region selector 604 is also provided. In this case, region selector 604 has an individual bit for each region within flag array 608. Thus, indexed instruction disabling register 600 provides a total coverage for 8192 instructions in 32 different regions. Note that if the region identifier were binary encoded within region selector 604, then billions of instructions could be theoretically covered. However, binary encoding into region selector 604 may be slower than using region selector 604 as a series of individual flags, and thus may be less desirable in at least some embodiments. Further note that the division of the instruction set into 32 different regions may also not be optimal. In some cases, it is desirable to divide the instruction set into a far fewer number of regions, such as one, two, four, or eight regions. In the particular example where the instruction set is divided into only two regions, the first bit of region selector 604 may be used as a simple flag that indicates whether flag array 608 currently represents the first half of the instruction set or the second half. If the instruction set is divided into three or four regions, then the first one to four bits (depending on the embodiment) may be used to indicate which region is covered. It should be noted that as the number of regions represented increases, returns for the divisions can be diminished. Although this saves storage space on the registers, it can incur more overhead in loading the various regions in and out of flag array 608.

Figure 7:
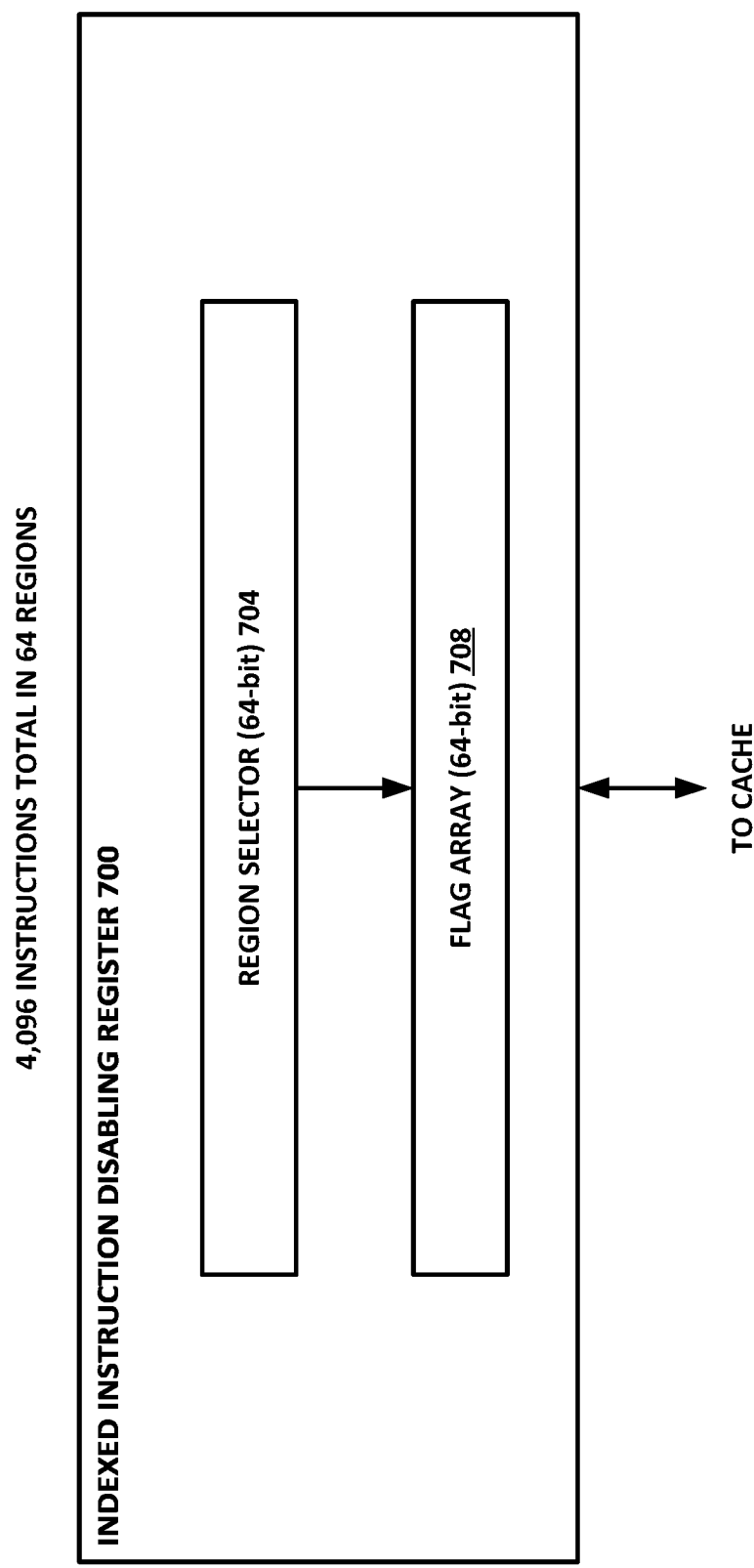
FIG. 7 illustrates an embodiment wherein register space may be at a premium.

FIG. 7 illustrates an embodiment wherein register space may be at a premium, while performance is at less of a premium. In this case, a single 64-bit flag array 708 may be used within indexed instruction disabling register 700 to represent up to 4096 total instructions. However, these instructions are divided into 64 regions according to region selector 704.

Indexed instruction disabling register 700 and indexed instruction disabling register 600 of FIG. 6 are configured in a manner to not represent the full instructions set at one time. Thus, privileged software operating on these registers may be able to operate only on a particular region at one time, or alternatively, the full instruction set flag array may be stored in a different structure, such as in cache.

These embodiments are at least useful in the case where certain groups of instructions are provided contiguously, and may be of interest. For example, indexed instruction disabling register 700 includes the flag array 708 of only 64 bits, which can represent only 64 discrete instructions. However, this may still be useful in a commercial context if there are 64 known instructions that are of interest and that may need to be disabled for business reasons, such as to charge some customers less for a less performant processor. If the instructions of interest are grouped into a single region of 64 instructions, then any or all of those instructions can be disabled by privileged software. The other instructions, which are not presently of interest to the particular commercial case, can be ignored. However, because the ISA supports a bitmap array for the entire instruction set architecture, if other instructions later become of greater interest, those instructions can be disabled by providing a different region, or by expanding future processors with a larger flag array 708.

FIGS. 8a-8d illustrate various locking mechanisms that may be provided in different embodiments of the present specification. FIG. 8a illustrates a data structure 804. Data structure 804 has addresses from 0 to n representing a total of n+1 instructions. For example, in the case where n=1999, 2,000 total instructions may be provided. In one example, positions 1500 through 1999 are reserved for future instruction set expansion.

Data structure 804 includes an NOP flag for each instruction, as well as a #UD flag for each instruction. Data structure 804 also includes a separate lock bit for each instruction. Thus, when a lock bit is set, a competing flag cannot be set without first unsetting the previous lock. For example, the instruction represented by address 2 is currently set to NOP. In other words, the NOP flag at address 2 is set. Because the lock bit for address 2 is not set, privileged software could set the #UD bit for address 2 without unsetting the NOP bit. However, in this embodiment, the NOP flag takes precedence over the #UD flag. Thus, although privileged software can set the #UD flag, this will have no effect when the NOP flag is already set. In other words, while the operation is technically allowed, the behavior will not be as expected for the programmer, because the programmer has misused the mechanism. However advantageously, the program flow is significantly simplified. When the lock bit is not set, the system programmer can freely set and unset either flag, with no checks being performed.

FIG. 8b illustrates an embodiment of a data structure 808 without a separate lock mechanism for each address. In this embodiment, a system programmer may first set the NOP flag. With the NOP flag for address 2 set, the #UD flag field is effectively converted into a lock field. If the system programmer sets the #UD flag, then the NOP value is locked and the NOP field for address 2 cannot be unset unless and until the #UD flag is also first unset. Similarly, if the #UD flag is first set, then the NOP field for that instruction effectively becomes a lock flag. If the #UD field is set first, and then the NOP field is set, the #UD field cannot be unset until the NOP flag is first unset.

FIGS. 8c and 8d illustrate data structures 812 and 816, in which the operation of a lock flag is illustrated. In these FIGURES, a separate lock field is provided per instruction, although the methods illustrated herein can be extended to an embodiment where the second flag set is treated as a lock flag.

In data structure 812, the NOP flag is set for address 2, and the lock flag is set for address 2. This means that NOP is set, and it should not be possible to set a #UD flag for address 2 without first unsetting the NOP flag. Note that in this embodiment, the processor may provide logic to enforce the lock flag, which may be more complex, but provides additional security mechanisms.

In data structure 816, an attempt to set the #UD flag for instruction 2 when the NOP bit and the lock bit for that instruction are both set results in throwing an error or exception. A programmer who wants to set the #UD flag for instruction 2 will first need to either unset the lock bit, or unset the NOP flag. Note that if the programmer unsets the lock bit and then sets #UD, no exception will be thrown, but again, the behavior may not be as expected. Because the NOP flag takes precedence in this embodiment, the #UD flag is ignored when the NOP flag is set.

FIGS. 9a-9b illustrate data structures 904 and 908. Data structures 904 and 908 operate substantially similarly to the data structures of FIG. 8. However, in the example of data structures 904 and 908, a global lock flag is given for the entire data structure. This may be useful in an embodiment where it is desirable to globally lock or unlock instruction flags.

In data structure 904, the global lock flag is set to 0. Thus, a system programmer can set an NOP flag for instruction 2, and can freely set or unset the #UD flag for the same instruction. As described above, setting the NOP flag first will mean that the #UD flag is effectively ignored, because the NOP flag has precedence. In other embodiments, the precedence could be reversed and the #UD flag could have precedence.

In data structure 908, the global lock flag is set. This means between addresses 0 and n, the lock is set. Thus, if an NOP flag is set for address 2, then any attempt to set the #UD flag for that same address will result in the CPU throwing an error or exception. Before the #UD flag can be set for address 2, the system programmer must either globally unlock the data structure, or unset the NOP flag for address 2. Again, note that if the system programmer unlocks the global data structure, then attempting to set the #UD flag after the NOP flag is already set will result in no change. The NOP flag takes precedence. However, if the #UD flag is already set and the system programmer then sets the NOP flag (with the lock mechanism unset, either globally or for a specific instruction), then the NOP flag will effectively override the #UD flag.

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

FIGS. 10a-10b are block diagrams illustrating a generic vector-friendly instruction format and instruction templates thereof, which may be configured to provide flexible instruction set disabling as disclosed in the present specification.

FIG. 10a is a block diagram illustrating a generic vector-friendly instruction format and class A instruction templates thereof according to embodiments of the specification; while FIG. 10b is a block diagram illustrating the generic vector-friendly instruction format and class B instruction templates thereof according to embodiments of the specification. Specifically, a generic vector-friendly instruction format 1000 for which are defined class A and class B instruction templates, both of which include no memory access 1005 instruction templates and memory access 1020 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10a include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, nontemporal 1030 instruction template. The class B instruction templates in FIG. 10b include: 1) within the no memory access 1005 instruction templates there is shown a no memory access, write mask control, partial round control type operation 1012 instruction template and a no memory access, write mask control, VSIZE type operation 1017 instruction template; and 2) within the memory access 1020 instruction templates there is shown a memory access, write mask control 1027 instruction template.

The generic vector-friendly instruction format 1000 includes the following fields listed below in the order illustrated in FIGS. 10a-10b.

Format field 1040—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 1042—its content distinguishes different base operations.

Register index field 1044—its content, directly or through address generation, specifies the locations of the source and destination operands, be they in registers or in memory. These include a sufficient number of bits to select n registers from a P×Q (e.g. 32×512, 16×128, 32×1024, 64×1024) register file. While in one embodiment n may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Memory access fields 1046A and 1046B—their content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations. Augmentation operation field 1050— its content distinguishes which one of a variety of different operations to be performed in addition to the base operation. This field is context specific. In one embodiment of the specification, this field is divided into a class field 1068, an alpha field 1052, and a beta field 1054. The augmentation operation field 1050 allows common groups of operations to be performed in a single instruction rather than two, three, or four instructions.

Scale field 1060—its content allows for the scaling of the index field's content for memory address generation (e.g., for address generation that uses $2^{scale}*\text{index}+\text{base}$).

Displacement Field 1062A—its content is used as part of memory address generation (e.g., for address generation that uses $2^{scale}*\text{index}+\text{base}+\text{displacement}$).

Displacement Factor Field 1062B (note that the juxtaposition of displacement field 1062A directly over displacement factor field 1062B indicates one or the other is used) —its content is used as part of address generation; it specifies a displacement factor that is to be scaled by the size of a memory access (n) —where n is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operand's total size (n) in order to generate the final displacement to be used in calculating an effective address. The value of n is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation) —in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the specification are described in which the write mask field's 1070 content selects one of a number of write mask registers that contains the write mask to be used (and thus the write mask field's 1070 content indirectly identifies that masking to be performed), alternative embodiments instead or additionally allow the mask write field's 1070 content to directly specify the masking to be performed.

Immediate field 1072—its content allows for the specification of an immediate. This field is optional in the sense that is it not present in an implementation of the generic vector-friendly format that does not support immediate and it is not present in instructions that do not use an immediate.

Class field 1068—its content distinguishes between different classes of instructions. With reference to FIGS. 10a-10b, the contents of this field select between class A and class B instructions. In FIGS. 10a-10b, rounded corner squares are used to indicate a specific value is present in a field (e.g., class A 1068A and class B 1068B for the class field 1068 respectively in FIGS. 10a-10b).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed.

In the no memory access 1005 instruction templates, the scale field 1060, the displacement field 1062A, and the displacement scale filed 1062B are not present.

No Memory Access Instruction Templates—Full Round Control Type Operation

In the no memory access full round control type operation 1010 instruction template, the beta field 1054 is interpreted as a round control field 1054A, whose content provides static rounding. While in the described embodiments of the specification the round control field 1054A includes a suppress all floating point exceptions (SAE) field 1056 and a round operation control field 1058, alternative embodiments may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating point exception flag and does not raise any floating point exception handler.

Round operation control field 1058—its content distinguishes which one of a group of rounding operations to perform (e.g., round-up, round-down, round-towards-zero and round-to-nearest). Thus, the round operation control field 1058 allows for the changing of the rounding mode on a per instruction basis. In one embodiment of the specification where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10*a*, temporal 1052B.1 and nontemporal 1052B.2 are respectively specified for the memory access, temporal 1025 instruction template and the memory access, nontemporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale field 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating point exception flag and does not raise any floating point exception handler).

Round operation control field 1059A—just as round operation control field 1058, its content distinguishes which one of a group of rounding operations to perform (e.g., round-up, round-down, round-towards-zero and round-to-nearest). Thus, the round operation control field 1059A allows for the changing of the rounding mode on a per instruction basis. In one embodiment of the specification where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted by the vector length field 1059B. The memory access 1020 instruction templates include the scale field 1060, and optionally the displacement field 1062A or the displacement scale field 1062B.

With regard to the generic vector-friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 11a-11d are block diagrams illustrating an example specific vector-friendly instruction format, which may be configured to provide flexible instruction set disabling as disclosed in the present specification.

Figure 11A:
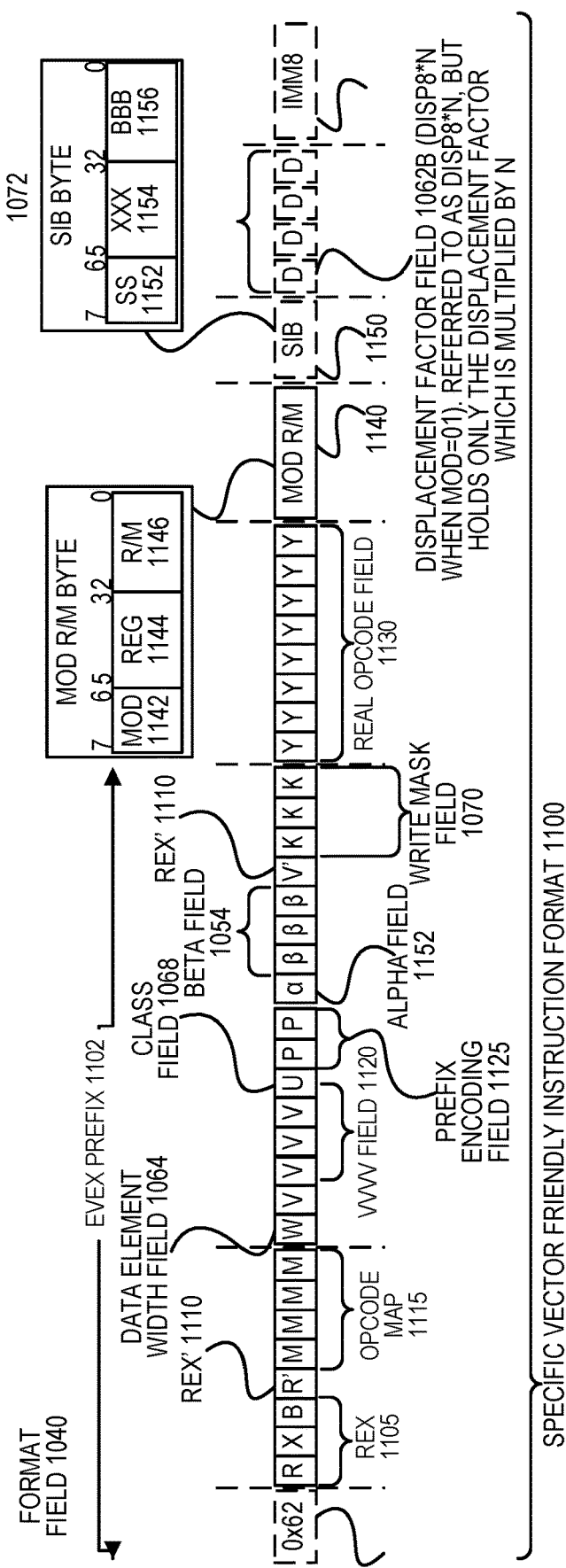
FIGS. 11a-11d are block diagrams illustrating an example specific vector-friendly instruction format.

FIG. 11a shows a specific vector-friendly instruction format 1100 that is specific in the sense that it specifies the location, size, interpretation, and order of the fields, as well as values for some of those fields. The specific vector-friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, Scale/Index/Base (SIB) field, displacement field, and immediate fields of the existing x86 instruction set with extensions. The fields from FIGS. 10a and 10b into which the fields from FIG. 11a map are illustrated.

It should be understood that, although embodiments of the specification are described with reference to the specific vector-friendly instruction format 1100 in the context of the generic vector-friendly instruction format 1000 for illustrative purposes, the present specification is not limited to the specific vector-friendly instruction format 1100 except where claimed. For example, the generic vector-friendly instruction format 1000 contemplates a variety of possible sizes for the various fields, while the specific vector-friendly instruction format 1100 is shown as having fields of specific sizes. By way of particular example, while the data element width field 1064 is illustrated as a one bit field in the specific vector-friendly instruction format 1100, the present specification is not so limited (that is, the generic vector-friendly instruction format 1000 contemplates other sizes of the data element width field 1064).

The generic vector-friendly instruction format 1000 includes the following fields listed below in the order illustrated in FIG. 11a.

EVEX Prefix (Bytes 0-3) 1102—is encoded in a four-byte form.

Format Field 1040 (EVEX Byte 0, bits [7:0]) —the first byte (EVEX Byte 0) is the format field 1040 and it contains 0x62 (the unique value used for distinguishing the vector-friendly instruction format in one embodiment).

The second through fourth bytes (EVEX Bytes 1-3) include a number of bit fields providing specific capability.

REX field 1105 (EVEX Byte 1, bits [7-5]) —consists of an EVEX.R bit field (EVEX Byte 1, bit [7]—R), EVEX.X bit field (EVEX byte 1, bit [6]-X), and 1057BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]-mmmm) —its content encodes an implied leading opcode byte (0F, 0F 38, or 0F 3).

Data element width field 1064 (EVEX byte 2, bit [7]-W) —is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv) —the role of EVEX.vvvv may include the following: 1) EVEX.vvvv encodes the first source register operand, specified in inverted (1s complement) form and is valid for instructions with two or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the four low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U) —if EVEX.0=0, it indicates class A or EVEX.U0; if EVEX.0=1, it indicates class B or EVEX.U1.

Prefix encoding field 1125 (EVEX byte 2, bits [1:0]-pp) —provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only two bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA) (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.eh, EVEX.rs, EVEX.rl, EVEX.write mask control, and EVEX.n; also illustrated with α) —as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ) —as previously described, this field is context specific.

REX' field 1010—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk) —its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

SIB Byte (Byte 6) —as previously described, the scale field's 1150 content is used for memory address generation. SIB.ss 1152, SIB.xxx 1154, and SIB.bbb 1156—the contents of these fields have been previously referred to with regard to the register indexes Xxxx and Bbbb.

Displacement field 1062A (Bytes 7-10) —when MOD field 1142 contains 10, bytes 7-10 are the displacement field 1062A, and it works the same as the legacy 32-bit displacement (disp32) and works at byte granularity.

Displacement factor field 1062B (Byte 7) —when MOD field 1142 contains 01, byte 7 is the displacement factor field 1062B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses eight bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

Figure 11B:
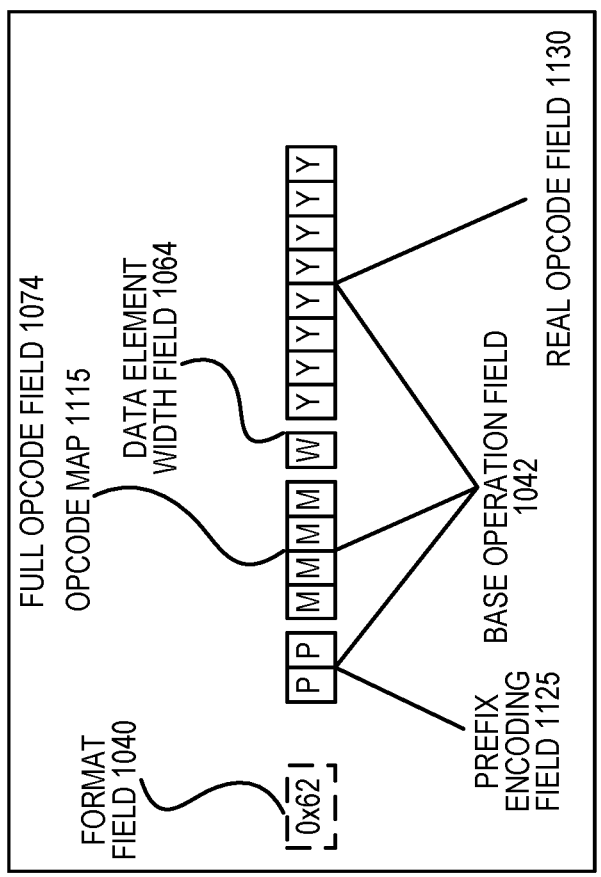

FIG. 11*b* is a block diagram illustrating the fields of the specific vector-friendly instruction format 1100 that make up the full opcode field 1074 according to one embodiment. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

Figure 11C:
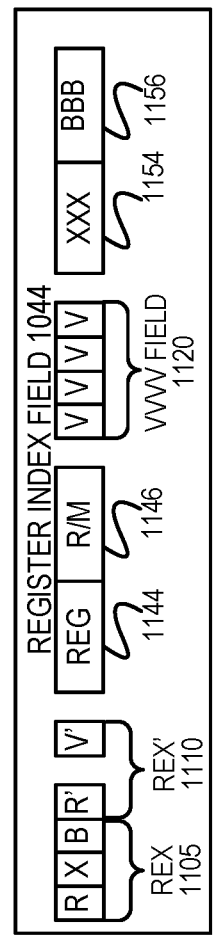

FIG. 11*c* is a block diagram illustrating the fields of the specific vector-friendly instruction format 1100 that make up the register index field 1044 according to one embodiment. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
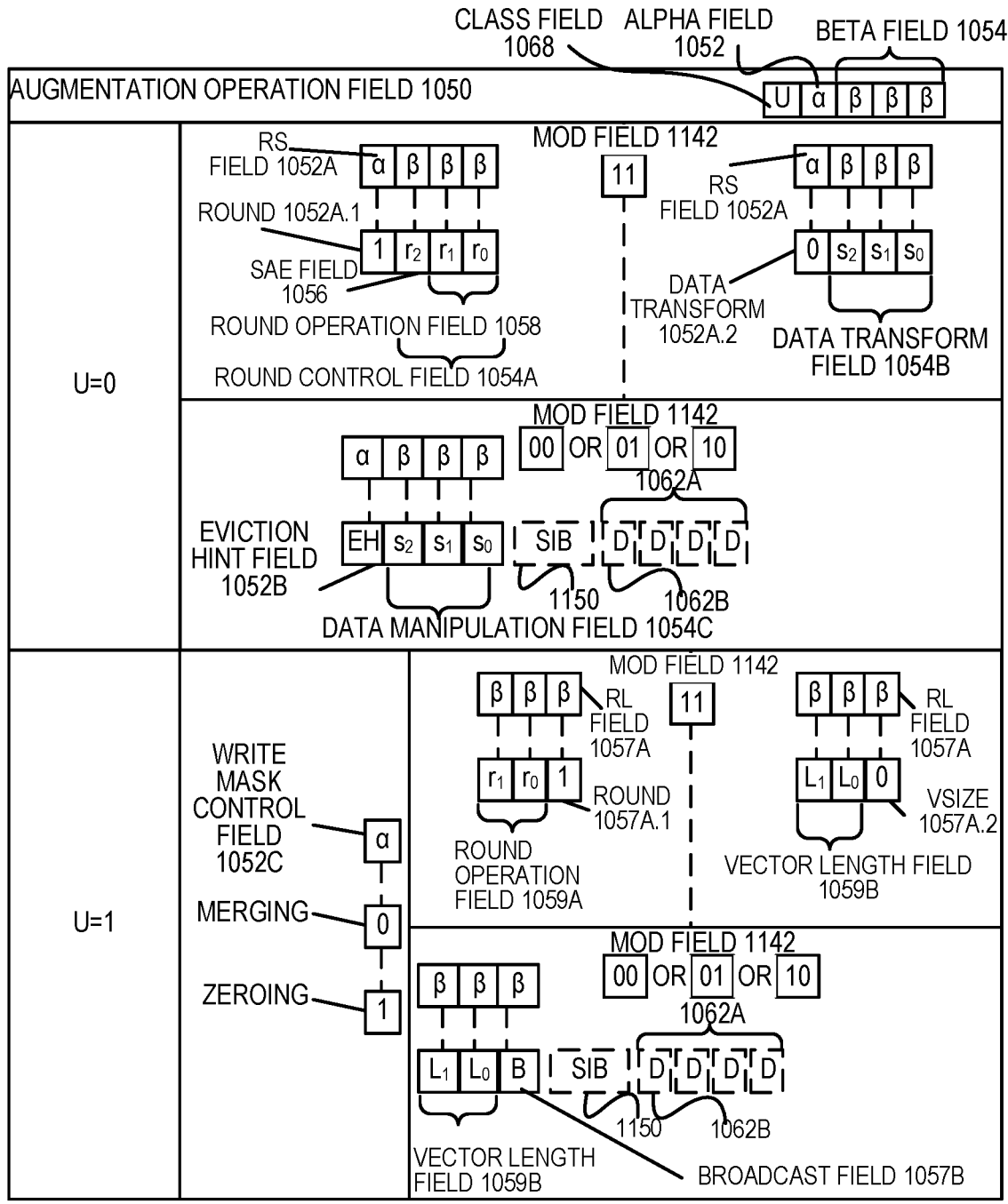

FIG. 11*d* is a block diagram illustrating the fields of the specific vector-friendly instruction format 1100 that make up the augmentation operation field 1050 according to one embodiment. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]-EH) is interpreted as the rs field 1052A. When the rs field 1052A contains a 1 (round 1052A.1), the beta field 1054 (EVEX byte 3, bits [6:4]-SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]-SSS) is interpreted as a three bit data transform field 1054B. When U=0 and the MOD field 1142 contains 00, 01, or 10 (signifying a memory access operation), the alpha field 1052 (EVEX byte 3, bit [7]-EH) is interpreted as the eviction hint (EH) field 1052B and the beta field 1054 (EVEX byte 3, bits [6:4]-SSS) is interpreted as a three bit data manipulation field 1054C.

When U=1, the alpha field 1052 (EVEX byte 3, bit [7]-EH) is interpreted as the write mask control (Z) field 1052C. When U=1 and the MOD field 1142 contains 11 (signifying a no memory access operation), part of the beta field 1054 (EVEX byte 3, bit [4]-$S_0$) is interpreted as the RL field 1057A; when it contains a 1 (round 1057A.1) the rest of the beta field 1054 (EVEX byte 3, bit [6-5]-$S_{2-1}$) is interpreted as the round operation field 1059A, while when the RL field 1057A contains a 0 (VSIZE 1057.A2) the rest of the beta field 1054 (EVEX byte 3, bit [6-5]-$S_{2-1}$) is interpreted as the vector length field 1059B (EVEX byte 3, bit [6-5]-$L_{1-0}$). When U=1 and the MOD field 1142 contains 00, 01, or 10 (signifying a memory access operation), the beta field 1054 (EVEX byte 3, bits [6:4]-SSS) is interpreted as the vector length field 1059B (EVEX byte 3, bit [6-5]-$L_{1-0}$) and the broadcast field 1057B (EVEX byte 3, bit [4]-B).

Example Register Architecture

Figure 12:
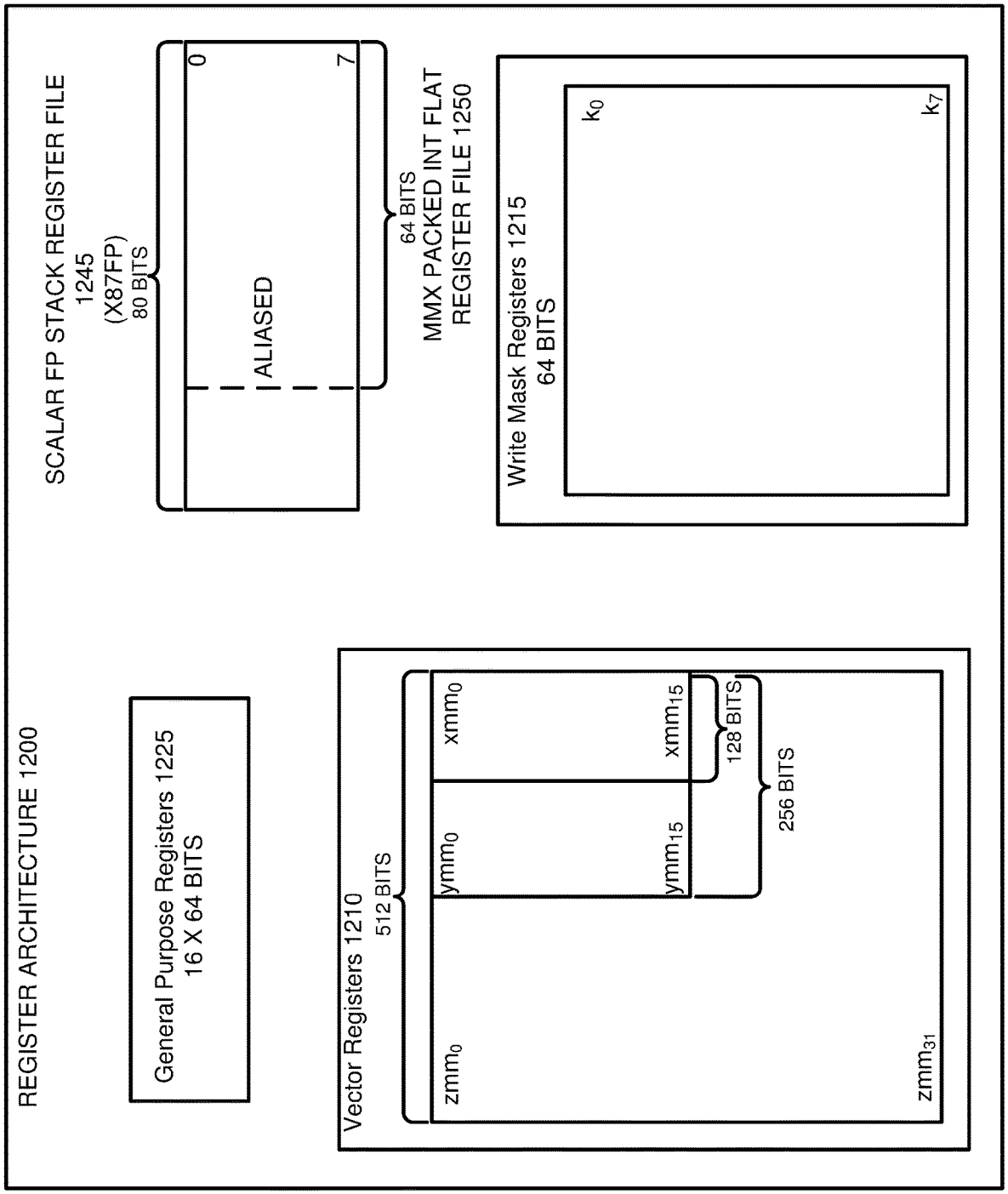
FIG. 12 is a block diagram of a register architecture.

FIG. 12 is a block diagram of a register architecture 1200, which may be configured to provide flexible instruction set disabling as disclosed in the present specification. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 1100 operates on these overlaid register files as illustrated in the below tables.

| Adjustable Vector Length | Class | Operations | Registers |
| --- | --- | --- | --- |
| Instruction Templates that do not include the vector length field 1059B | A (FIG. 10a; U = 0) | 1010, 1015, 1025, 1030 | zmm registers (the vector length is 64 byte) |
| | B (FIG. 10b; U = 1) | 1012 | zmm registers (the vector length is 64 byte) |
| Instruction templates that do include the vector length field 1059B | B (FIG. 10b; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instruction templates without the vector length field 1059B operate on the maximum vector length. Further, in one embodiment, the class B instruction templates of the specific vector-friendly instruction format 1100 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1215—in the embodiment illustrated, there are eight write mask registers (k0 through k7), each 64 bits in size. In an alternate embodiment, the write mask registers 1215 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General purpose registers 1225—in the embodiment illustrated, there are sixteen 64-bit general purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general purpose computing; 2) a high performance general purpose out-of-order core intended for general purpose computing; 3) a special-purpose core intended primarily for graphics and/or scientific (throughput) computing. Implementations of different processors may include: 1) a CPU including one or more general purpose in-order cores intended for general purpose computing and/or one or more general purpose out-of-order cores intended for general purpose computing; and 2) a coprocessor including one or more special-purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special-purpose logic, such as integrated graphics and/or scientific (throughput) logic, or as special-purpose cores); and 4) a system-on-a-chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

FIG. 13a is a block diagram illustrating both an example in-order pipeline and an example register renaming, out-of-order issue/execution pipeline. FIG. 13b is a block diagram illustrating both an embodiment of an in-order architecture core and an example register renaming, out-of-order issue/execution architecture core to be included in a processor. The examples of FIGS. 13a-13b may be configured to provide flexible instruction set disabling as disclosed in the present specification.

The solid lined boxes in FIGS. 13a-13b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 13a, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13b shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, microcode entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, PLAs, microcode read-only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservation stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 performs the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 14a-14b illustrate a block diagram of a more specific example in-order core architecture, which core would be one of several logic blocks (including other cores of the same type and/or different types) in a chip. The examples of FIGS. 14a-14b may be configured to provide flexible instruction set disabling as disclosed in the present specification.

The logic blocks communicate through a high-bandwidth interconnect network (e.g., a ring network) with some fixed function logic, memory I/O interfaces, and other necessary I/O logic, depending on the application.

FIG. 14a is a block diagram of a single processor core, along with its connection to the on-die interconnect network 1402 and with its local subset of the Level 2 (L2) cache 1404, according to one or more embodiments. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, other embodiments may use a different approach (e.g., use a single register set or include a communication path that allows data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14b is an expanded view of part of the processor core in FIG. 14a according to embodiments of the specification. FIG. 14b includes an L1 data cache 1406A, part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
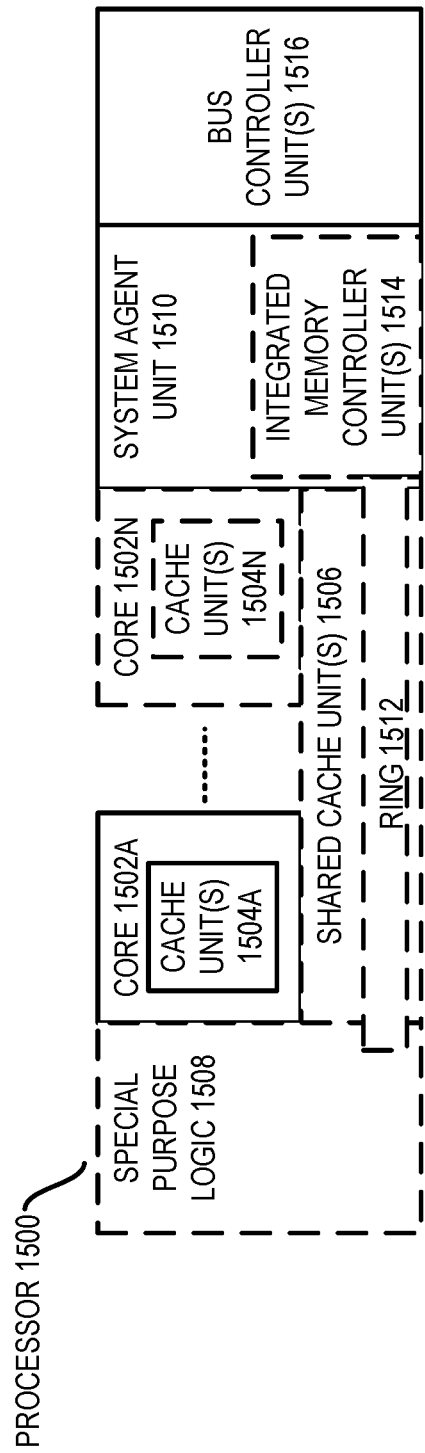
FIG. 15 is a block diagram of a processor that may have more than one core, may have an integrated memory controller, and may have integrated graphics.

FIG. 15 is a block diagram of a processor 1500 that may have more than one core, may have an integrated memory controller, and may have integrated graphics according to embodiments of the specification. The example of FIG. 15 may be configured to provide flexible instruction set disabling as disclosed in the present specification.

The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, cache units 1504A-N, a set of one or more integrated memory controller unit(s) 1514 in the system agent unit 1510, and special-purpose logic 1508.

Thus, different implementations of the processor 1500 may include: 1) a CPU with the special-purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special-purpose cores intended primarily for graphics and/or scientific throughput; and 3) a coprocessor with the cores 1502A-N being a large number of general purpose in-order cores. Thus, the processor 1500 may be a general purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multithreading. The system agent 1510 includes those components coordinating and operating cores 1502A-N. The system agent unit 1510 may include, for example, a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of executing the same instruction set, while others may be capable of executing only a subset of that instruction set or a different instruction set.

Example Computer Architectures

FIGS. 16-19 are block diagrams of example computer architectures, which may be configured to provide flexible instruction set disabling as disclosed in the present specification. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
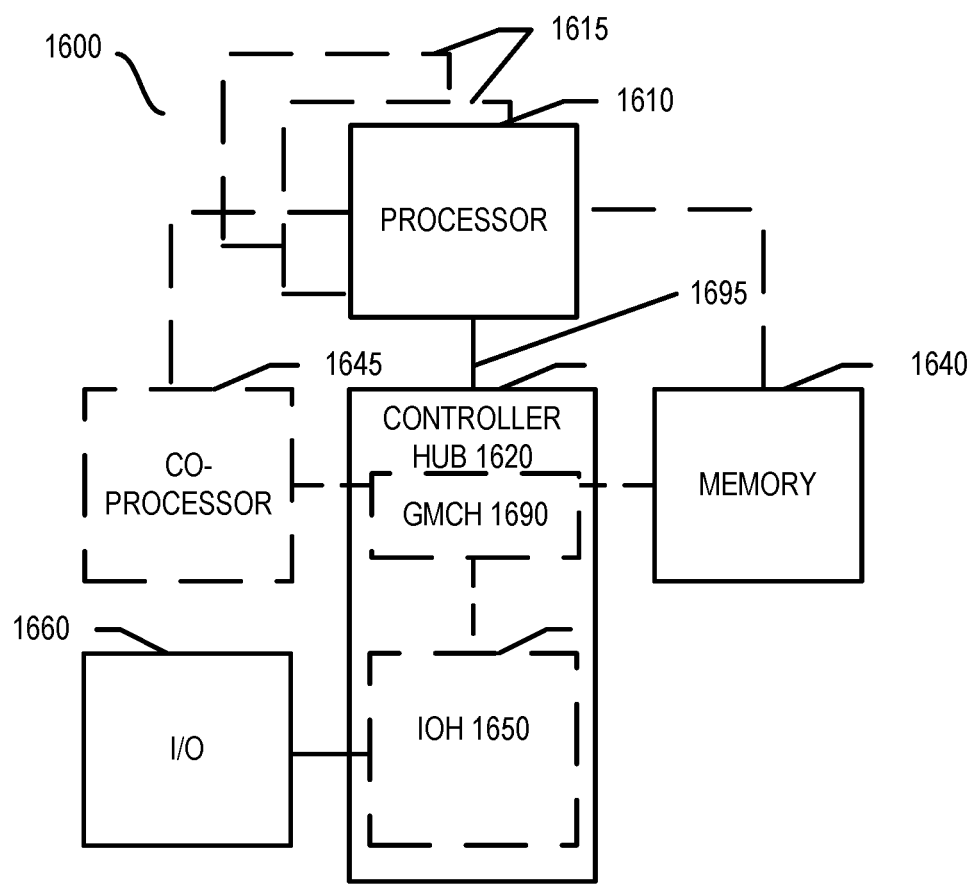
FIGS. 16-19 are block diagrams illustrating a variety of computer architectures.

Referring now to FIG. 16, shown is a block diagram of a system 1600 in accordance with one embodiment. The system 1600 may include one or more processors 1610, 1615, which are coupled to a controller hub 1620. In one embodiment the controller hub 1620 includes a graphics memory controller hub (GMCH) 1690 and an input/output hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multidrop bus, such as a frontside bus (FSB), point-to-point interface such as Ultra Path Interconnect (UPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accepts and executes the received coprocessor instructions.

Figure 17:
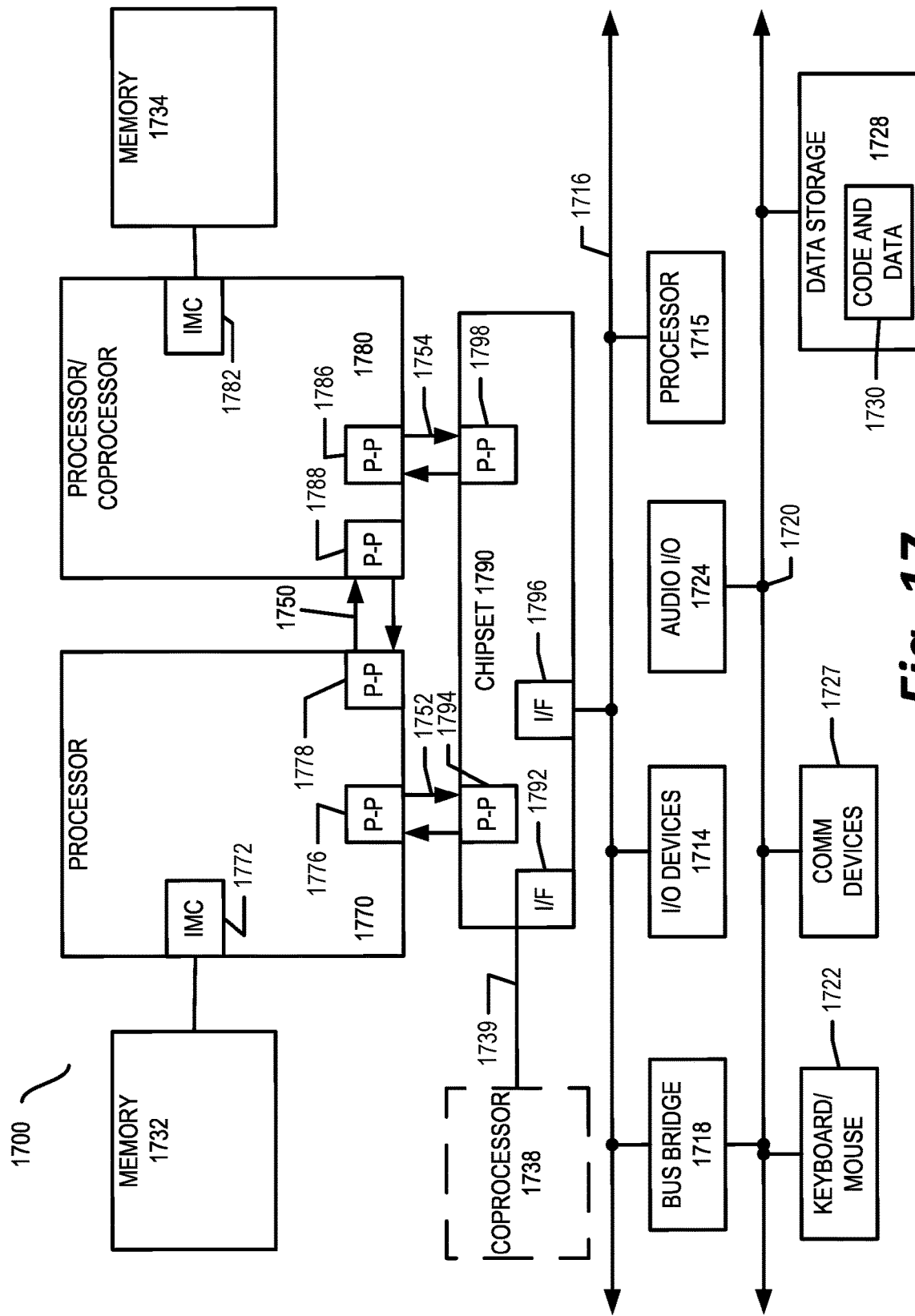

Referring now to FIG. 17, shown is a block diagram of a first more specific example system 1700. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point-to-point interface circuits 1776, 1794, 1786, 1798. Chipset 1790 may optionally exchange information with the coprocessor 1738 via a high performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a peripheral component interconnect (PCI) bus, or a bus such as a PCI Express bus or another third generation IO interconnect bus, by way of nonlimiting example.

As shown in FIG. 17, various IO devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPUs, accelerators (such as, e.g., graphics accelerators or DSP units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions or code and data 1730, in one embodiment. Further, an audio IO 1724 may be coupled to the second bus 1720. Note that other architectures are possible. For example, instead of the point-to-point architecture of FIG. 17, a system may implement a multidrop bus or other such architecture.

Figure 18:
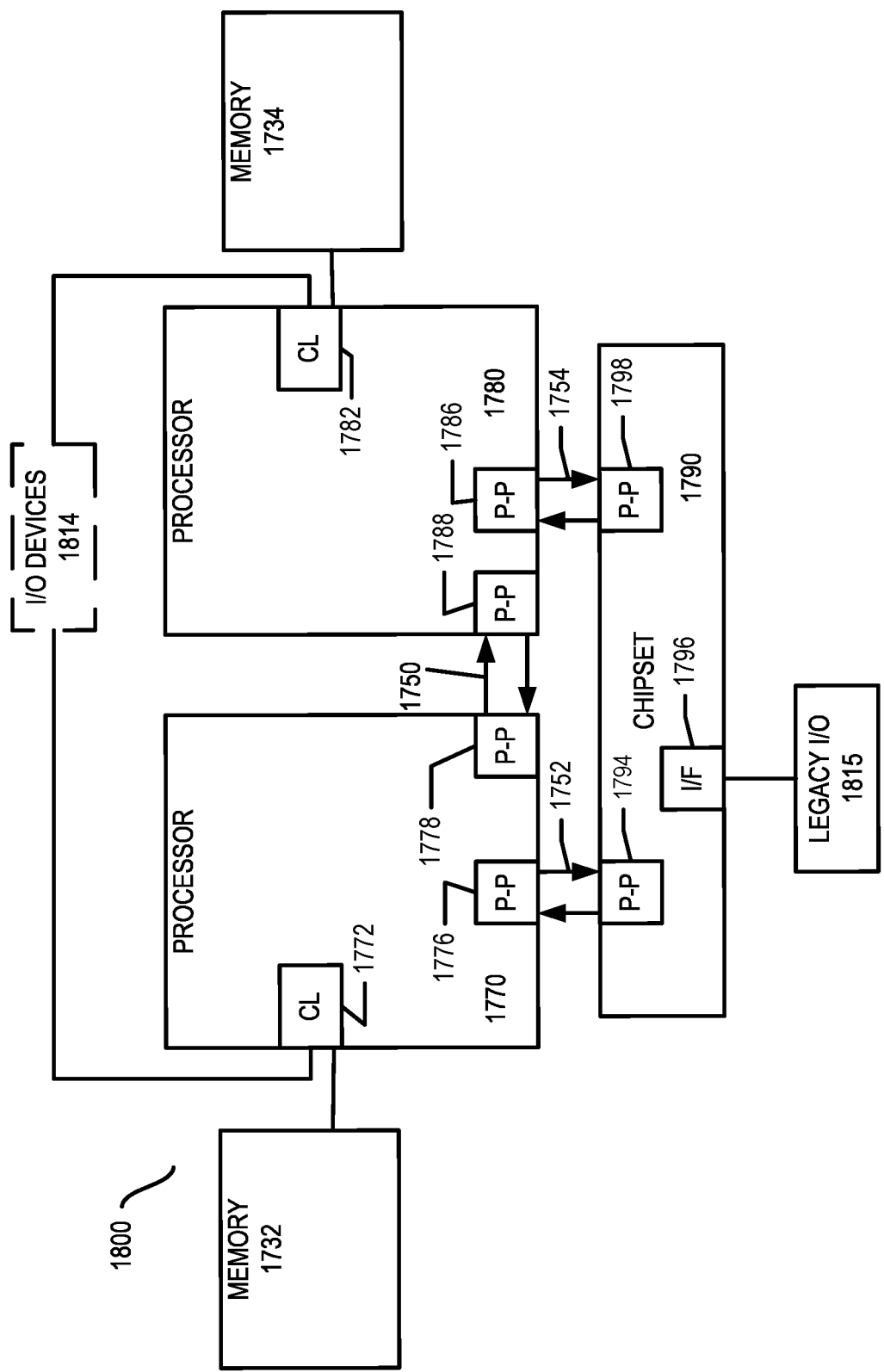

Referring now to FIG. 18, shown is a block diagram of a second more specific example system 1800. FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and IO control logic ("CL") 1772 and 1782, respectively. Thus, the CL 1772, 1782 include IMC units and include IO control logic. FIG. 18 illustrates that not only are the memories 1732, 1734 coupled to the CL 1772, 1782, but also that IO devices 1814 are also coupled to the control logic 1772, 1782. Legacy IO devices 1815 are coupled to the chipset 1790.

Figure 19:
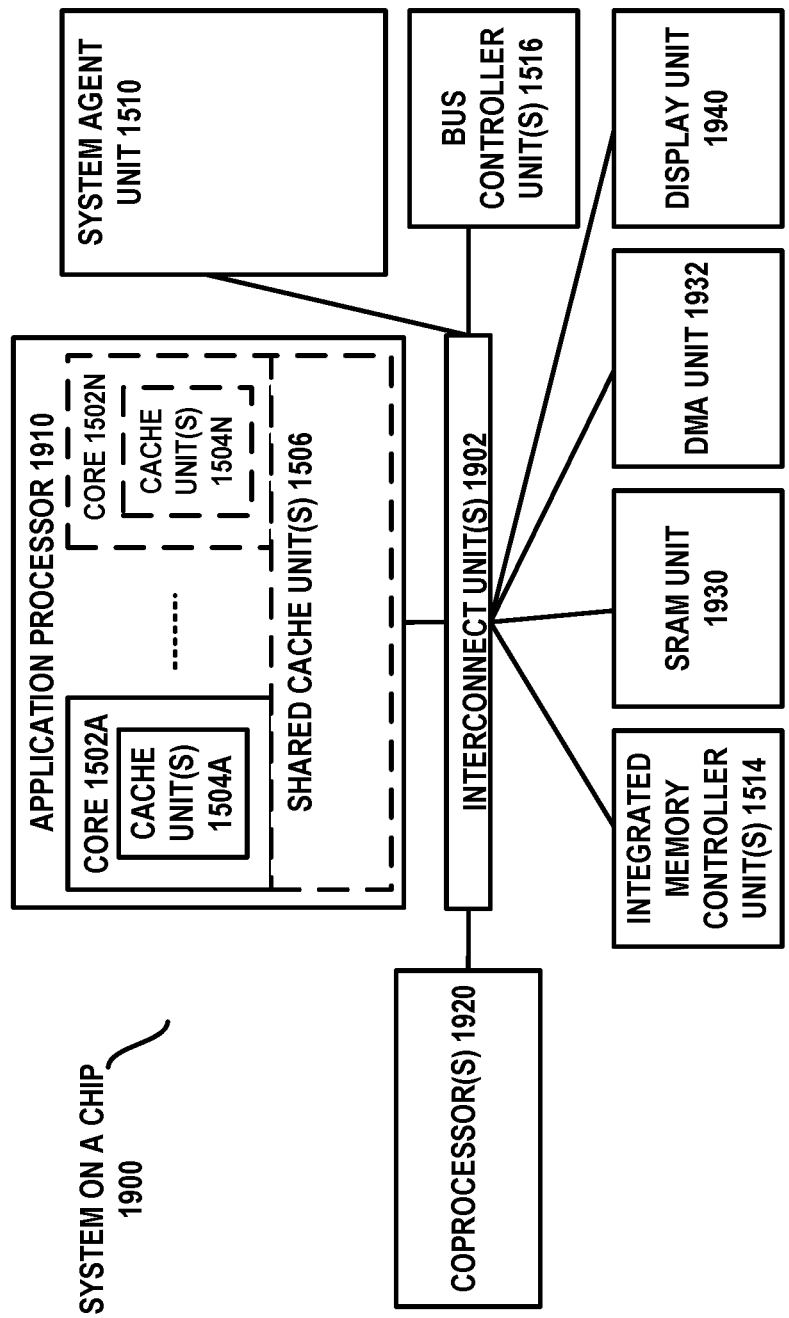

Referring now to FIG. 19, shown is a block diagram of a system-on-a-chip (SoC) 1900 in accordance with an embodiment. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N and shared cache unit(s) 1506; a system agent unit 1510; a bus controller unit(s) 1516; IMC unit(s) 1514; a set of one or more coprocessors 1920 which may include integrated graphics logic, an image processor, an audio processor, and a video processor; a static random access memory (SRAM) unit 1930; a direct memory access (DMA) unit 1932; and a display unit 1940 for coupling to one or more external displays. In one embodiment, the coprocessor(s) 1920 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example, a DSP, a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard discs, any other type of disk including floppy disks, optical disks, compact disc read-only memories (CD-ROMs), compact disc rewritables (CD-RWs), and magneto-optical disks, semiconductor devices such as ROMs, random access memories (RAMs) such as DRAMs, SRAMs, erasable programmable read-only memories (EPROMs), flash memories, electrically erasable programmable read-only memories (EEPROMs), PCM, magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
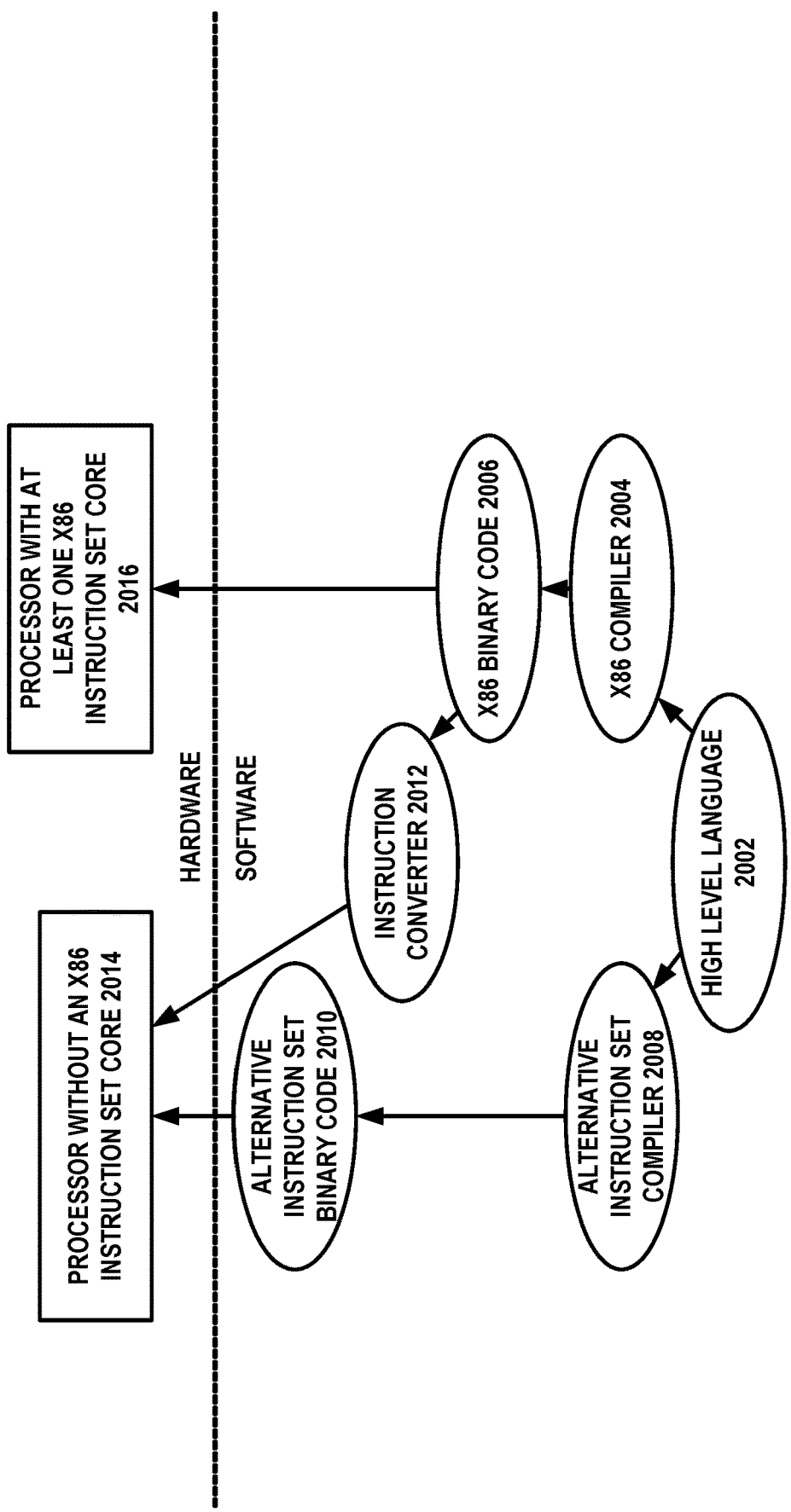
FIG. 20 is a block diagram contrasting the use of a software instruction converter to convert binary instructions in a source instruction set to binary instructions in a target instruction set.

FIG. 20 is a block diagram contrasting the use of a software instruction converter to convert binary instructions in a source instruction set to binary instructions in a target instruction set. The example of FIG. 20 may be configured to provide flexible instruction set disabling as disclosed in the present specification.

In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types.

A computer-readable medium may include, by way of nonlimiting example, an optical drive (e.g., CD/DVD/Blu-Ray), a hard drive, a solid-state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator).

In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a microprocessor, comprising: a decoder; an execution unit; an instruction set flag vector; and logic to decode an instruction, read a binary disable flag for the instruction within the instruction set flag vector, and execute the instruction within the execution unit only if the disable flag for the instruction is not set.

There is further disclosed an example microprocessor, further comprising logic to, after reading the binary disable flag for the instruction, check a legacy disable mechanism for the instruction, and execute the instruction in the execution unit only if the legacy disable mechanism is not set.

There is further disclosed an example microprocessor, wherein the instruction set flag vector has a disable flag for substantially every instruction within an instruction set architecture (ISA) of the microprocessor.

There is further disclosed an example microprocessor, wherein the instruction set flag vector further includes disable flags for instructions not within the ISA of the microprocessor, but within an ISA for a different microprocessor in a common microprocessor family with the microprocessor.

There is further disclosed an example microprocessor, wherein the instruction set flag vector comprises a full 1:1 mapping of flags to instructions within the ISA.

There is further disclosed an example microprocessor, wherein the instruction set flag vector comprises 1:n mapping of flags to an nth part of the ISA, and wherein the microprocessor further comprises a field to select a portion of n portions of the ISA resides within the instruction set flag vector.

There is further disclosed an example microprocessor, wherein the microprocessor further comprises means to store a non-selected portion of the ISA off-core.

There is further disclosed an example microprocessor, wherein the logic comprises microcode.

There is further disclosed an example microprocessor, wherein the instruction set flag vector comprises a no operation (NOP) flag per instruction, to indicate that an NOP should be performed on a call to the instruction.

There is further disclosed an example microprocessor, wherein the instruction set flag vector comprises an error flag per instruction, to indicate that an exception should be raised on a call to the instruction.

There is further disclosed an example microprocessor, wherein the instruction set flag vector comprises first and second disable flags per instruction.

There is further disclosed an example microprocessor, wherein the instruction set flag vector further comprises a lock bit per instruction.

There is further disclosed an example microprocessor, wherein the microprocessor further comprises logic to: receive a set directive for the first flag; thereafter, receive a set directive for the second flag; detect an attempt to unset the first flag without first unsetting the second flag; and raise an exception responsive to the attempt.

There is also disclosed an example method of providing full-instruction set architecture (ISA) disabling for a processor, comprising: receiving an instruction as a next instruction in a program sequence; decoding the instruction; querying a full-ISA bitmap for a disable flag associated with the instruction; determining that the disable flag is not set; and executing the instruction normally in microcode.

There is further disclosed an example method, further comprising determining that the disable flag is set, and taking a non-execution action in lieu of executing the instruction.

There is further disclosed an example method, wherein the non-execution action is a no operation (NOP).

There is further disclosed an example method, wherein the non-execution action is an exception or error.

There is further disclosed an example method, further comprising, after querying the disable associated with the instruction, checking a legacy disable mechanism for the instruction, and executing the instruction in microcode only if neither the disable flag nor the legacy disable mechanism is set.

There is further disclosed an example method, wherein the full-ISA bitmap comprises a flag for every instruction within the ISA.

There is further disclosed an example method, wherein the full-ISA bitmap includes disable flags for instructions not within the ISA of the microprocessor, but within an ISA for a different microprocessor in a common microprocessor family with the microprocessor.

There is further disclosed an example method, wherein the full-ISA bitmap includes 1:1 mapping of flags to instructions within the ISA.

There is further disclosed an example method, wherein the full-ISA bitmap includes 1:n mapping of flags to an nth part of the ISA, and wherein the microprocessor further comprises a field to select a portion of n portions of the ISA resides within the instruction set flag vector.

There is further disclosed an example method, further comprising storing non-selected portions of the ISA off-core.

There is further disclosed an example method, wherein the full-ISA bitmap comprises a no operation (NOP) flag per instruction, to indicate that an NOP should be performed on a call to the instruction.

There is further disclosed an example method, wherein the full-ISA bitmap comprises an error flag per instruction, to indicate that an exception should be raised on a call to the instruction.

There is further disclosed an example method, wherein the full-ISA bitmap comprises first and second disable flags per instruction.

There is further disclosed an example method, wherein the full-ISA bitmap further comprises a lock bit per instruction.

There is further disclosed an example method, further comprising: receiving a set directive for the first flag; thereafter, receiving a set directive for the second flag; detecting an attempt to unset the first flag without first unsetting the second flag; and raising an exception responsive to the attempt.

There is further disclosed an example apparatus, comprising means for performing the method of a number of the above examples.

There is further disclosed an example apparatus, wherein the means for performing the method comprise a microprocessor.

There is further disclosed an example apparatus, wherein the microprocessor comprises non-transitory microcode instructions that, when executed, cause the microprocessor to perform the method of a number of the above examples.

There is further disclosed an example of at least one non-transitory computer readable medium comprising instructions that, when executed, implement a method or realize an apparatus as illustrated in a number of the above examples.

There is also disclosed an example of a non-transitory computer-readable medium having stored thereon microcode instructions to: receive and decode an instruction; query an instruction set architecture (ISA) bitmap for an address associated with the instruction; receive a disable flag stored at the address; determine that the disable flag is not set; and cause the instruction to be executed.

There is further disclosed an example of a non-transitory computer-readable medium, wherein the microcode instructions are further to determine that the disable flag is set, and take a non-execution action instead of executing the instruction.

There is further disclosed an example of a non-transitory computer-readable medium, wherein the non-execution action is a no operation (NOP).

There is further disclosed an example of a non-transitory computer-readable medium, wherein the non-execution action is an exception or error.

There is further disclosed an example of a non-transitory computer-readable medium, wherein the microcode instructions are further to, after querying the disable associated with the instruction, check a legacy disable mechanism for the instruction, and cause the instruction to be executed only if neither the disable flag nor the legacy disable mechanism is set.

There is further disclosed an example of a non-transitory computer-readable medium, wherein the ISA bitmap comprises a flag for every instruction within the ISA.

There is further disclosed an example of a non-transitory computer-readable medium, wherein the ISA bitmap further includes disable flags for instructions not within the ISA of the microprocessor, but within an ISA for a different microprocessor in a common microprocessor family with the microprocessor.

There is further disclosed an example of a non-transitory computer-readable medium, wherein the full-ISA bitmap includes 1:1 mapping of flags to instructions within the ISA.

There is further disclosed an example of a non-transitory computer-readable medium, wherein the ISA bitmap includes 1:n mapping of flags to an nth part of the ISA, and wherein the microprocessor further comprises a field to select a portion of n portions of the ISA resides within the instruction set flag vector.

There is further disclosed an example of a non-transitory computer-readable medium, wherein the microcode instructions are further to store non-selected portions of the ISA off-core.

There is further disclosed an example of a non-transitory computer-readable medium, wherein the ISA bitmap comprises a no operation (NOP) flag per instruction, to indicate that an NOP is to be performed on a call to the instruction.

There is further disclosed an example of a non-transitory computer-readable medium, wherein the ISA bitmap comprises an error flag per instruction, to indicate that an exception is to be raised on a call to the instruction.

There is further disclosed an example of a non-transitory computer-readable medium, wherein the ISA bitmap comprises first and second disable flags per instruction.

There is further disclosed an example of a non-transitory computer-readable medium, wherein the ISA bitmap further comprises a lock bit per instruction.

There is further disclosed an example of a non-transitory computer-readable medium, wherein the microcode instructions are further to: receive a set directive for the first flag; receive a set directive for the second flag; detect an attempt to unset the first flag without first unsetting the second flag; and raise an exception responsive to the attempt.

What is claimed is:

1. A microprocessor to provide an instruction set architecture (ISA), comprising:
    a decoder;
    an execution unit;
    an instruction set flag vector; and
    logic to decode an instruction, read a binary disable flag for the instruction within the instruction set flag vector, wherein the binary disable flag is applicable to the instruction individually, execute the instruction within the execution unit only if the binary disable flag for the instruction is not set, and replace the instruction with a no operation (NOP) if the binary disable flag for the instruction is set;
    wherein the instruction set flag vector comprises 1:1 or 1:n mapping of per-instruction disable flags for all or substantially all instructions within the ISA, wherein n is an integer greater than 1.

2. The microprocessor of claim 1, further comprising logic to, after reading the binary disable flag for the instruction, check a legacy disable mechanism for the instruction, and execute the instruction in the execution unit only if the legacy disable mechanism is not set.

3. The microprocessor of claim 1, wherein the instruction set flag vector has a disable flag for substantially every instruction within an instruction set architecture (ISA) of the microprocessor.

4. The microprocessor of claim 3, wherein the instruction set flag vector further includes disable flags for instructions not within the ISA of the microprocessor, but within an ISA for a different microprocessor in a common microprocessor family with the microprocessor.

5. The microprocessor of claim 3, wherein the instruction set flag vector comprises a full 1:1 mapping of flags to instructions within the ISA.

6. The microprocessor of claim 3, wherein the instruction set flag vector comprises 1:n mapping of flags to an nth part of the ISA, and wherein the microprocessor further comprises a field to select a portion of n portions of the ISA that resides within the instruction set flag vector.

7. The microprocessor of claim 6, wherein the microprocessor further comprises means to store a non-selected portion of the ISA off-core.

8. The microprocessor of claim 1, wherein the logic comprises microcode.

9. The microprocessor of claim 1, wherein the instruction set flag vector comprises a no operation (NOP) flag per instruction, to indicate that an NOP should be performed on a call to the instruction.

10. The microprocessor of claim 1, wherein the instruction set flag vector comprises an error flag per instruction, to indicate that an exception should be raised on a call to the instruction.

11. The microprocessor of claim 1, wherein the instruction set flag vector comprises first and second disable flags per instruction.

12. The microprocessor of claim 11, wherein the instruction set flag vector further comprises a lock bit per instruction.

13. The microprocessor of claim 11, wherein the microprocessor further comprises logic to:
    receive a set directive for the first disable flag;
    thereafter, receive a set directive for the second disable flag;
    detect an attempt to unset the first disable flag without first unsetting the second disable flag; and
    raise an exception responsive to the attempt.

14. A method of providing full-instruction set architecture (ISA) disabling for a processor, comprising:
    receiving an instruction as a next instruction in a program sequence;
    decoding the instruction;
    querying a full-ISA bitmap for a disable flag associated with the instruction, wherein the full-ISA bitmap comprises 1:1 or 1:n mapping of per-instruction disable flags for all or substantially all instructions within the ISA, wherein n is an integer greater than 1;
    individually determining whether the disable flag is set for the instruction;
    executing the instruction normally if the disable flag is not set; and
    if the disable flag is set, replace the instruction with a no operation (NOP).

15. The method of claim 14, further comprising determining that the disable flag is set, and taking a non-execution action in lieu of executing the instruction.

16. The method of claim 15, wherein the non-execution action is a no operation (NOP).

17. The method of claim 15, wherein the non-execution action is an exception or error.

18. A non-transitory computer-readable medium having stored thereon microcode instructions to:
    receive and decode an instruction;
    query an instruction set architecture (ISA) bitmap for an address associated with the instruction, wherein the ISA bitmap comprises 1:1 or 1:n mapping of per-instruction disable flags for all or substantially all instructions within the ISA, wherein n is an integer greater than 1;
    receive a disable flag stored at the address, the disable flag being associated with the instruction individually;
    determine whether the disable flag is set;
    if the disable flag is not set, cause the instruction to be executed;
    if the disable flag is set, replace the instruction with a no operation (NOP).

19. The non-transitory computer-readable medium of claim 18, wherein the microcode instructions are further to, after querying the disable flag associated with the instruction, check a legacy disable mechanism for the instruction, and cause the instruction to be executed only if neither the disable flag nor the legacy disable mechanism is set.

20. The non-transitory computer-readable medium of claim 18, wherein the ISA bitmap comprises a flag for every instruction within the ISA.

* * * * *